(12) United States Patent
Hirose et al.

(10) Patent No.: US 11,829,903 B2
(45) Date of Patent: Nov. 28, 2023

(54) INFORMATION PROVIDING METHOD AND INFORMATION PROVIDING DEVICE

(71) Applicant: Nissan Motor Co., Ltd., Kanagawa (JP)

(72) Inventors: Satoru Hirose, Kanagawa (JP); Kayoko Hara, Kanagawa (JP); Shigeki Satou, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 456 days.

(21) Appl. No.: 16/635,467

(22) PCT Filed: Aug. 1, 2017

(86) PCT No.: PCT/JP2017/027912
§ 371 (c)(1),
(2) Date: Jan. 30, 2020

(87) PCT Pub. No.: WO2019/026180
PCT Pub. Date: Feb. 7, 2019

(65) Prior Publication Data
US 2020/0372418 A1    Nov. 26, 2020

(51) Int. Cl.
*G06Q 10/02*    (2012.01)
*G01C 21/20*    (2006.01)
(Continued)

(52) U.S. Cl.
CPC ............ *G06Q 10/02* (2013.01); *G01C 21/20* (2013.01); *G01C 21/3438* (2013.01);
(Continued)

(58) Field of Classification Search
CPC ........ G06Q 10/02; G06Q 10/06; G01C 21/20; G01C 21/3438; H04W 4/023; H04W 4/027; H04W 4/029; G08G 1/123
(Continued)

(56) References Cited

U.S. PATENT DOCUMENTS

| | | | | |
|---|---|---|---|---|
| 2014/0082069 A1* | 3/2014 | Varoglu | ................. | G06Q 50/01 709/204 |
| 2015/0317568 A1* | 11/2015 | Grasso | .................. | G06Q 10/10 705/5 |
| 2016/0048777 A1* | 2/2016 | Kitagawa | ............. | G06Q 10/025 705/6 |
| 2016/0132792 A1* | 5/2016 | Rosnow | ................. | G06Q 10/02 705/5 |

(Continued)

FOREIGN PATENT DOCUMENTS

| | | |
|---|---|---|
| JP | 2003006294 A | 1/2003 |
| JP | 2003-044702 A | 2/2003 |

(Continued)

OTHER PUBLICATIONS

Uber Blog; "5 Reasons to Use uberPOOL" https://www.uber.com/en-US/blog/5-reasons-to-use-uberpool/; Sep. 7, 2016. (Year: 2016).*

*Primary Examiner* — Dione N. Simpson
(74) *Attorney, Agent, or Firm* — Osha Bergman Watanabe & Burton LLP

(57) ABSTRACT

The present disclosure includes acquiring a desired condition from a user who uses a shared vehicle, determining whether or not the shared vehicle can be reserved on the basis of the desired condition, and when the reservation of the shared vehicle is completed, providing information including a destination of the shared vehicle reserved to other users as reservation information of the shared vehicle.

12 Claims, 11 Drawing Sheets

(51) Int. Cl.
 *G01C 21/34* (2006.01)
 *G06Q 50/30* (2012.01)
 *H04W 4/02* (2018.01)
 *H04W 4/029* (2018.01)
 *G06Q 10/06* (2023.01)
 *G08G 1/123* (2006.01)

(52) U.S. Cl.
 CPC ............ *G06Q 50/30* (2013.01); *H04W 4/023* (2013.01); *H04W 4/027* (2013.01)

(58) Field of Classification Search
 USPC .......................................................... 705/5
 See application file for complete search history.

(56) References Cited

U.S. PATENT DOCUMENTS

| | | |
|---|---|---|
| 2016/0320195 A1* | 11/2016 | Liu .................. G01C 21/3438 |
| 2016/0321566 A1 | 11/2016 | Liu et al. |
| 2016/0364679 A1 | 12/2016 | Cao |
| 2016/0364823 A1 | 12/2016 | Cao |
| 2017/0169366 A1* | 6/2017 | Klein .................. G06Q 10/047 |

FOREIGN PATENT DOCUMENTS

| | | |
|---|---|---|
| JP | 2003-167946 A | 6/2003 |
| JP | 2009-289192 A | 12/2009 |
| JP | 2016-176903 A | 10/2016 |
| JP | 2016191992 A | 11/2016 |
| JP | 2017-010188 A | 1/2017 |
| WO | 2016/159815 A1 | 10/2016 |

\* cited by examiner

INFORMATION PROVIDING METHOD AND INFORMATION PROVIDING DEVICE

TECHNICAL FIELD

The present invention relates to an information providing method and an information providing apparatus for providing reservation information of a shared vehicle to be used by a plurality of users.

BACKGROUND ART

A technique is known for introducing other persons who share a ride on a taxicab via a communication network. In such a technique, a ride-sharing mediation system is known which includes a boarding information storage means that stores and manages boarding information for each user (Patent Document 1: JP2003-44702A). The boarding information includes at least a boarding location and a destination. The system further includes a selection means, a calculation means, a guidance means, a determination means, and a transmission means. When application for ride-sharing is received, the selection means refers to the boarding information storage means to select a candidate person who can share a ride in a similar direction. The calculation means calculates at least any of information regarding a deviation of an estimated travel route when the present ride-sharing applicant and the candidate person share a ride and information regarding the fee paid for by each person. The guidance means guides the calculated information to the ride-sharing applicant and the candidate person. When agreement between the ride-sharing applicant and the candidate person can be obtained, the determination means makes a determination that the ride-sharing is established. When the determination is made that the ride-sharing is established, the transmission means transmits information including a meeting place to the candidate person for ride-sharing.

PRIOR ART DOCUMENT

Patent Document

[Patent Document 1] JP2003-44702A

SUMMARY OF INVENTION

Problems to be Solved by Invention

In the above prior art, after the application for ride-sharing is received, some processes are performed for coordinating the ride-sharing, including selection of candidate persons who can share a ride. Accordingly, the person who desires ride-sharing has to preliminarily input the boarding information which includes the boarding location and the destination. Thus, the above prior art has a problem in that the number of users of ride-sharing may not readily increase.

A problem to be solved by the present invention is to make it possible to readily increase the number of users of ride-sharing.

Means for Solving Problems

The present invention solves the above problem through acquiring a desired condition from a user who uses a shared vehicle, determining whether or not the shared vehicle can be reserved on the basis of the desired condition, and when the reservation of the shared vehicle is completed, providing information including a destination of the shared vehicle reserved to other users as reservation information of the shared vehicle.

Effect of Invention

According to the present invention, information on a vehicle available for ride-sharing is provided to persons who desire ride-sharing, and the number of users of ride-sharing can readily be increased.

MODE(S) FOR CARRYING OUT THE INVENTION

Hereinafter, embodiments of the present invention will be described with reference to the drawings.

First Embodiment

The information providing apparatus according to an embodiment of the present invention will be described with reference to the drawings, hereinafter. The present embodiment will be described using an example in which the information providing apparatus is applied to a shared vehicle management system that manages and operates a car sharing system configured such that a plurality of users shares a plurality of vehicles allocated to a plurality of stations. Specifically, the description will be made on the assumption that the information providing apparatus according to the present embodiment is applied to a shared vehicle management apparatus of the shared vehicle management system. In the car sharing system of the present embodiment, the station from which a shared vehicle is rented and the station to which the shared vehicle is returned may be or may not be the same. Each station represents a location at which shared vehicles can be parked, rented, and returned and shared vehicles not in use can be on standby. Examples of such a station include a parking area prepared for the car sharing system.

Figure 1A:
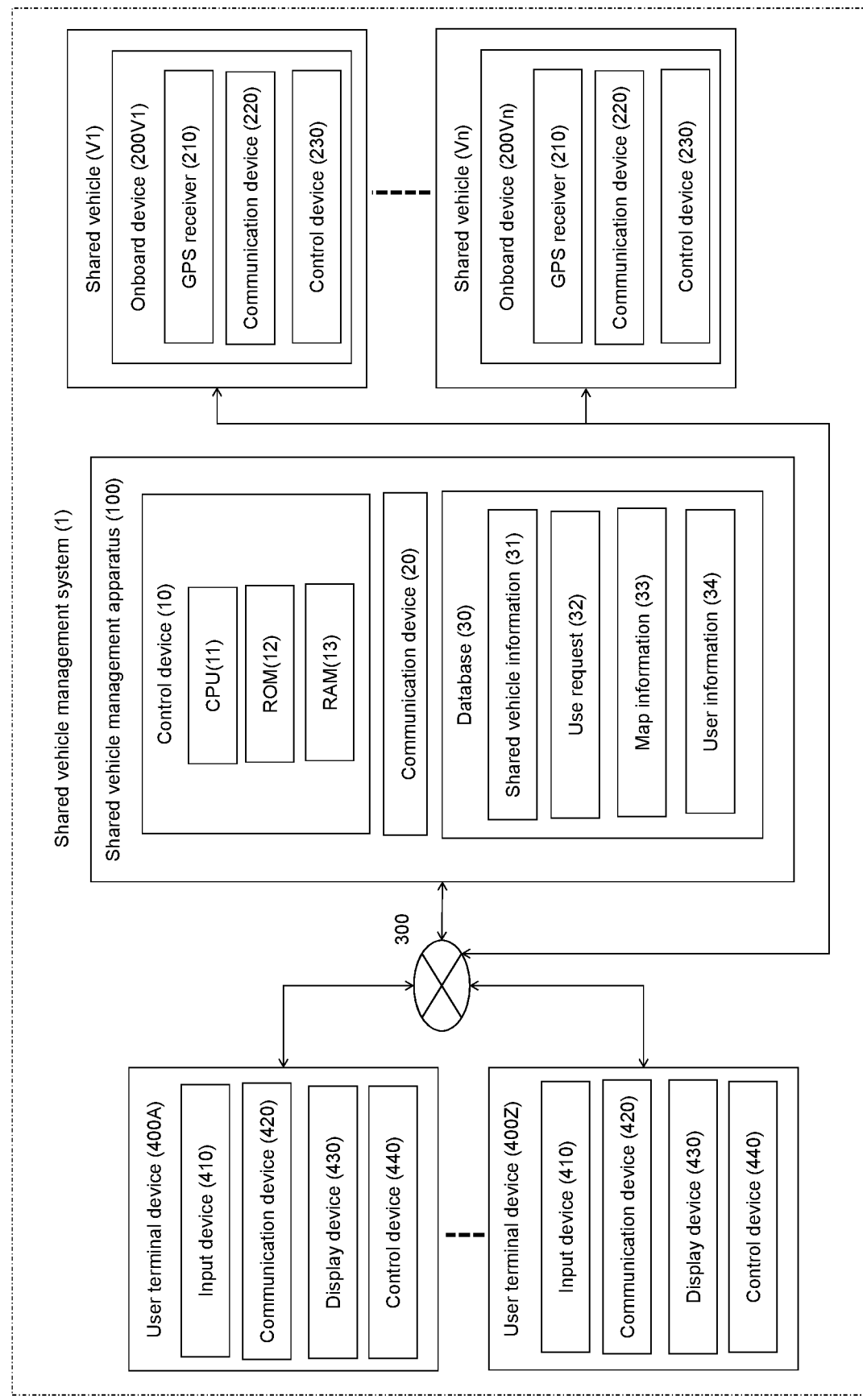
FIG. 1A is a block diagram of a shared vehicle management system including an information providing apparatus according to a first embodiment.

FIG. 1A is a block diagram illustrating a shared vehicle management system 1 according to the present embodiment. As illustrated in FIG. 1A, the shared vehicle management system 1 according to the present embodiment includes a shared vehicle management apparatus 100, onboard devices 200V1 to 200Vn (which may be collectively referred to as an "onboard device 200Vn," hereinafter) carried respectively by shared vehicles V1 to Vn (which may be collectively referred to as a "shared vehicle Vn" or "shared vehicles Vn," hereinafter) used by the users, and user terminal devices 400A to 400Z (which may be collectively referred to as a "user terminal device 400A," hereinafter) carried by the users. The numbers of the onboard devices 200V1 to 200Vn and user terminal devices 400A to 400Z, which constitute the shared vehicle management system 1 according to the present embodiment, are not limited.

The shared vehicle Vn of the present embodiment may be a vehicle having an automated or autonomous driving function that allows for traveling in an automated or autonomous manner without a driver. The shared vehicle Vn includes a drive mechanism and a steering mechanism, and these mechanisms are controlled fully in an automated or autonomous manner by the automated or autonomous function. The shared vehicle Vn may have a manual driving function that allows for traveling by the driver's driving operation, or may also be a vehicle capable of switching between the automated or autonomous driving function and the manual driving function. Any automated or autonomous driving technique at the time of filing of the present application can be appropriately used for the automated or autonomous driving function of the present embodiment.

Examples of the shared vehicle Vn according to the present embodiment include an electric car equipped with an electric motor as the drive source, an engine car equipped with an internal combustion engine as the drive source, and a hybrid car equipped with both an electric motor and an internal combustion engine as the drive sources. The electric cars and hybrid cars equipped with electric motors as the drive sources include those in which secondary batteries are used as power sources for the electric motors and those in which fuel cells are used as power sources for the electric motors.

Figure 1B:
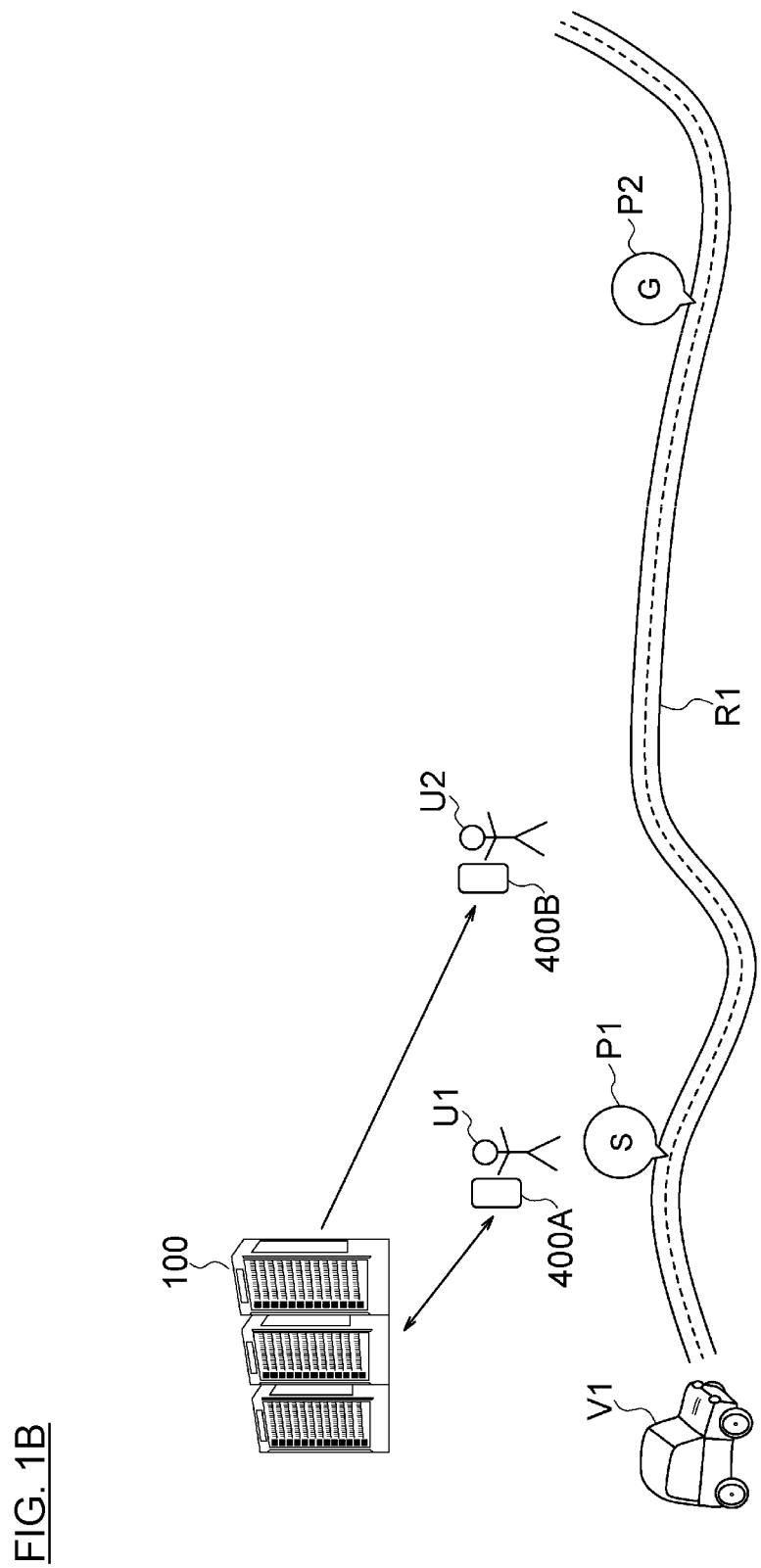
FIG. 1B is a schematic diagram illustrating an example of a method for users to use a shared vehicle in the shared vehicle management system including the information providing apparatus according to the first embodiment.

Here, FIG. 1B is a schematic diagram illustrating an example of a method for a user U1 to use a shared vehicle V1 in the shared vehicle management system 1 including the shared vehicle management apparatus 100 of the present embodiment. FIG. 1B illustrates a scene in which the user U1 uses the user terminal device 400A and expects to move from a departure place P1 set by the user U1 to a destination P2 using the shared vehicle V1.

For example, when the user U1 inputs the departure place P1 and the destination P2 to the user terminal device 400A in the scene illustrated in FIG. 1B, the input information is transmitted as a desired condition upon the use of the shared vehicle by the user U1 from the user terminal device 400A to the shared vehicle management apparatus 100.

The shared vehicle management apparatus 100 transmits a move command for moving to the departure place P1 and picking up the user U1 to the shared vehicle V1 which is selected on the basis of the desired condition. The move command includes a travel route from the current position of the shared vehicle V1 to the departure place P1 and a travel route R1 from the departure place P1 to the destination P2. When receiving the move command from the shared vehicle management apparatus 100, the shared vehicle V1 uses the automated or autonomous driving function to travel to the departure place P1 in an automated or autonomous manner without a driver. Then, when the user U1 gets on the shared vehicle V1 at the departure place P1, the shared vehicle V1 travels in an automated or autonomous manner to the destination P2 along the travel route R1 included in the move command. When the shared vehicle V1 arrives at the destination P2, the user U1 gets off the shared vehicle V1 and completes the use of the shared vehicle V1. Thereafter, the shared vehicle V1 returns to a station within a predetermined range from the destination P2.

In the present embodiment, the user can set arbitrary points such as a railway station and a commercial facility as the departure place and the destination.

On the other hand, in the scene illustrated FIG. 1B, the user U2 is a user, like the user U1, who can use the shared vehicle V1. For example, when the car sharing system is a members-only system for those registered as users, both the user U1 and the user U2 are the members registered as users. In general, the user U2 cannot know the usage situation of the shared vehicle V1 unless the user U2 requests use of the shared vehicle V1 to the shared vehicle management apparatus 100 via the user terminal device 400B. In the above-described example, even in the scene in which the shared vehicle V1 carrying the user U1 is traveling from the departure place P1 to the destination P2, the user U2 cannot perceive that the shared vehicle V1 is traveling, unless the user U2 requests use of the shared vehicle V1 to the shared vehicle management apparatus 100.

The above is the basic configuration of the car sharing system in the present embodiment. In the present embodiment, in such a car sharing system, when a use reservation of the shared vehicle V1 made by the user U1 is completed in the scene as illustrated in FIG. 1B, the reservation information of the shared vehicle V1 is notified to the user U2 via the user terminal device 400B. The content to be notified to the user U2 will be described later.

Referring again to FIG. 1A, each configuration of the shared vehicle management system 1 of the present embodiment will be described.

The shared vehicle management apparatus 100, the onboard devices 200V1 to 200Vn, and the user terminal devices 400A to 400Z include respective communication devices (20, 220, and 420) and can exchange information with one another via an electric communication network, such as the Internet 300. The communication path may be wired or wireless.

The user terminal device 400A of the present embodiment is a computer comprising a read only memory (ROM) that stores programs applied to the user terminal device 400A according to the present embodiment of the present invention, a central processing unit (CPU) as an operation circuit that executes the programs stored in the ROM to perform each function, and a random access memory (RAM) that serves as an accessible storage device. The user terminal device 400A of the present embodiment may be a personal computer, a smartphone, a personal digital assistant (PDA), or other handheld terminal device.

The user terminal device 400A of the present embodiment comprises an input device 410 that receives input information for requesting use of the shared vehicle Vn by each user, a communication device 420 that performs communication with external devices such as the shared vehicle management apparatus 100, a display device 430 for notifying each user of information, and a control device 440 that executes a control process for the use of the shared vehicle Vn by the user.

As the input device 410 of the user terminal device 400A, for example, a device with which the user can input data by manual operation, such as a touch panel disposed on the display screen or a joystick, and/or a device with which the user can input data by voice, such as a microphone, can be used.

The display device 430 notifies the user of information received from the shared vehicle management apparatus 100. Examples of the display device 430 include a display. When a touch panel display is used, it can serve as both the display device 430 and the input device 410. The display device 430 receives information on the shared vehicle Vn which has been reserved and relevant information from the shared vehicle management apparatus 100, for example, and notifies the user of the received information.

The control device 440 of the present embodiment uses a position acquisition device, such as a global positioning system (GPS) receiver (not illustrated), equipped in the user terminal device 400A to acquire information on the current position of the user who operates the user terminal device 400A. Examples of the information on the current position include information on the latitude and longitude. The control device 440 transmits the acquired information on the current position to the shared vehicle management apparatus 100 via the communication device 420. In the present embodiment, the control device 440 periodically transmits the information on the current position of each user to the shared vehicle management apparatus 100. This allows a control device 10 of the shared vehicle management apparatus 100, which will be described later, to acquire the current positional information of each user.

In addition, the control device 440 receives input information, such as a use request for requesting use of the shared vehicle Vn by each user, and transmits the received input information to the shared vehicle management apparatus 100 via the communication device 420. In the present embodiment, examples of the use request for the shared vehicle Vn include a request form of immediate use with which the user starts to use the shared vehicle Vn immediately after transmitting the use request.

The above-described use request includes ID information of the user, information on the current position of the user, information on the departure place which the user desires, ID information of the shared vehicle Vn which the user expects to use, information on the destination which the user desires, and the use start time which the user desires. The departure place which the user desires refers to a boarding location at which the user gets on the shared vehicle Vn while the destination which the user desires refers to a deboarding location at which the user gets off the shared vehicle Vn. If necessary, the user terminal device 400A of the present embodiment may receive other information from the shared vehicle management apparatus 100, such as information on each station and information on candidates for the shared vehicle Vn in each station.

In the present embodiment, one or both of the user terminal device 400A and the onboard device 200Vn may serve as a navigation device for guiding a travel route of the shared vehicle Vn to the user. Examples of the scene of serving as a navigation device include a scene in which the user drives the shared vehicle Vn when the shared vehicle Vn is a vehicle capable of switching between the automated or autonomous driving function and the manual driving function. When the user terminal device 400A serves as a navigation device, the user terminal device 400A may preliminarily store map information, for example, in a memory such as a ROM of the user terminal device 400A. The user terminal device 400A may display on the display device 430 the current position of the shared vehicle Vn which is currently used by the user and the position of the destination which is set by the user, together with the map information, and guide the travel route from the current position of the shared vehicle Vn to the destination.

The onboard device 200Vn of the present embodiment comprises a GPS receiver 210 that detects the current position of each shared vehicle Vn, a communication device 220 that performs communication with external devices such as the shared vehicle management apparatus 100, and a control device 230 that executes a control process for the use of the shared vehicle Vn by the user.

The onboard device 200Vn may be provided as a simple mechanism that utilizes functions of the user terminal device 400A. For example, when the user terminal device 400A is equipped with a GPS receiver, a communication device, devices for route calculation and route guidance, and other similar devices, the onboard device 200Vn may utilize their functions and perform only authentication of a user, which will be described below.

In the present embodiment, the control device 230 may use an authentication device (not illustrated) of the onboard device 200Vn to perform user authentication as to whether or not the user getting on the shared vehicle Vn is identical with the user who has requested use of the shared vehicle Vn. For example, the control device 230 uses a device capable of communication via near field communication (NFC) as the authentication device to read ID information of the user, such as from the user terminal device 400A or membership card carried by the user. The control device 230 accesses the shared vehicle management apparatus 100 via the communication device 220 to acquire the information on the use request for the shared vehicle Vn and performs user authentication of the user getting on the shared vehicle Vn.

The control device 230 transmits the information on the current position acquired using the GPS receiver 210 to the shared vehicle management apparatus 100 via the communication device 220.

The control device 230 notifies the user of the information transmitted from the shared vehicle management apparatus 100 and other information, such as using a display and/or a speaker, which are not illustrated. In the present embodiment, the control device 230 receives information regarding users who desire to share a ride on the shared vehicle Vn and other information from the shared vehicle management apparatus 100 and notifies the user of the received information. The ride-sharing and other similar terms as used in the present embodiment refer to a situation in which two or more persons get on one shared vehicle and, for example, refer to a situation in which a user and one or more other users get on one shared vehicle.

In the present embodiment, like the above-described user terminal device 400A, the onboard device 200Vn may also serve as a navigation device for guiding the travel route from the current position of the shared vehicle Vn to the destination.

The shared vehicle management apparatus 100 of the present embodiment, which serves as a server of the shared vehicle management system 1, comprises a control device 10 that executes a control process for managing and operating the car sharing system, a communication device 20 that can communicate mutually with each of the onboard device 200Vn and the user terminal device 400A, and a database 30 that stores the information received by the communication device 20, the information on each shared vehicle Vn, and other necessary information.

The database 30 stores shared vehicle information 31, a use request 32 received from a user, map information 33, and user information 34.

The shared vehicle information 31 is information regarding each shared vehicle Vn. The shared vehicle information 31 includes information on the current position of each shared vehicle Vn, the remaining power capacity and failure information of each shared vehicle Vn, a current usage situation of each shared vehicle Vn, and the like.

The use request 32 is input information, which each user inputs using the user terminal device 400A, for requesting use of the shared vehicle Vn. The use request 32 includes ID information of the user, ID information of the shared vehicle Vn which the user expects to use, information on the current position of the user, information representing the departure place, destination, and use start time which are set by the user, and other information.

The map information 33 is map information that also includes information on roads, facilities, and the like. The information on facilities includes, for example, information on the structure of a building representing the number of floors of the building, the passages of the building, the entrance and exit of the building, and the like. The map information 33 includes, for example, information regarding each station, such as positional information of each station, facility information around each station, traffic conditions around each station, and usage situations of each station.

The user information 34 is information on all the users who can use the car sharing system. The user information 34 includes ID information of all the users and information on current positions of all the users. For example, the communication device 20 receives the current positional information of each user at predetermined intervals from the user terminal device 400A of each user thereby to allow the current positional information of each user to be stored as the user information 34.

The moving speed of a user is also stored as the user information 34. In the present embodiment, the average moving speed of pedestrians (e.g., 80 meters per minute) is stored as the moving speed of the user in the user information 34. The moving speed of the user is not limited to the average moving speed of pedestrians. In addition or alternatively, for example, the average moving speed of bicycles may be used as the moving speed of the user, or the average moving speed of pedestrians moving at a relatively slow moving speed, such as elderly pedestrians, may also be used as the moving speed of the user.

As illustrated in FIG. 1A, the control device 10 of the shared vehicle management apparatus 100 of the present embodiment comprises a read only memory (ROM) 12 that stores programs for executing processes to manage and operate the car sharing system, a central processing unit (CPU) 11 as an operation circuit that executes the programs stored in the ROM 12 to serve as the shared vehicle management apparatus 100, and a random access memory (RAM) 13 that serves as an accessible storage device.

Figure 1C:
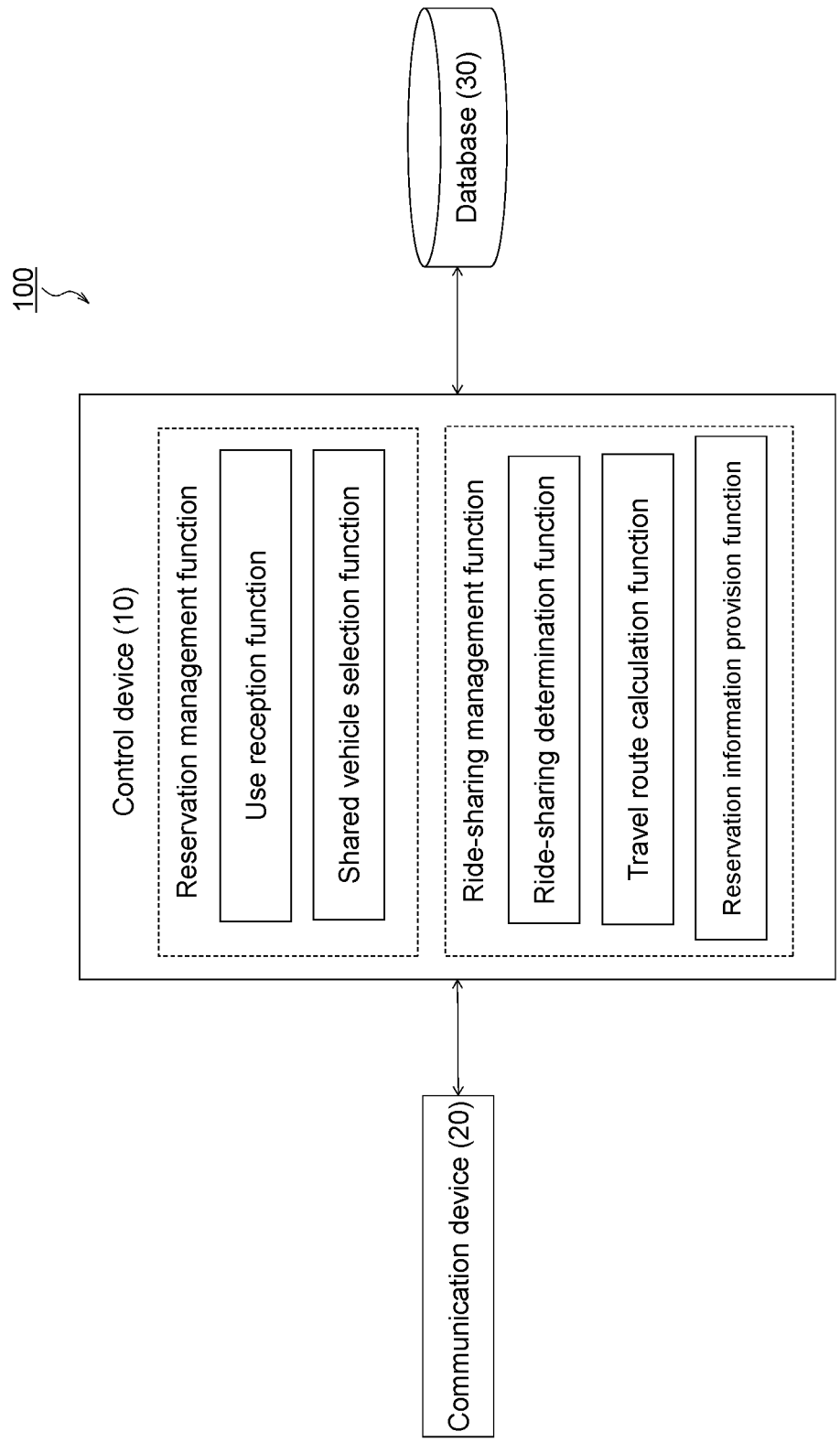
FIG. 1C is a diagram illustrating some functions of a control device provided in the information providing apparatus according to the first embodiment.

As illustrated in FIG. 1C, the control device 10 of the shared vehicle management apparatus 100 achieves a reservation management function and a ride-sharing management function. The reservation management function includes a use reception function, a shared vehicle selection function, and a notification function. The ride-sharing management function includes a travel route calculation function and a reservation information provision function. The control device 10 of the shared vehicle management apparatus 100 according to the present embodiment is a computer that realizes each function by cooperation of software for achieving the above functions and the above-described hardware.

The above functions achieved by the control device 10 of the shared vehicle management apparatus 100 will be described below.

First, in the reservation management function executed by the control device 10 of the present embodiment, the use reception function will be described. The control device 10 uses the use reception function to acquire a use request for requesting use of a shared vehicle Vn from a user via the user terminal device 400A. Then, the control device 10 controls the database 30 to store the acquired information on the use request together with the information on the time (reservation time) at which the use request was received.

For example, the user activates the communication device 420 of the user terminal device 400A to access the shared vehicle management apparatus 100 and specifies a desired type of vehicle which the user desires to get on from the shared vehicle information 31 stored in the database 30 of the shared vehicle management apparatus 100. The user also inputs a use start time as the time to start use of the shared vehicle Vn to the input device 410 of the user terminal device 400A. The user further inputs to the input device 410 the departure place as a location at which the user gets on the shared vehicle Vn and the destination as a location at which the user gets off the shared vehicle Vn. The user terminal device 400A transmits the input information to the shared vehicle management apparatus 100 via the communication device 420. The shared vehicle management apparatus 100 receives the vehicle type, use start time, departure place, and destination as the desired condition of the user.

When the user desires to start use of the shared vehicle Vn immediately after the application for use, the use start time may be a time on the day, while when the user desires to use the shared vehicle Vn on a different day than the day of the application for use, the start time may be a time of the day designated by the user. The way to express the departure place and the destination is not particularly limited and may be a specific address or may also be a specific facility name or a specific station name. The form of inputting the departure place and the desired destination is not particularly limited. For example, a form of inputting the departure place and the destination to the input device 410 may be employed, or a form of selecting the departure place and the destination from a map or searching for the departure place and the destination from the map may also be employed.

Next, in the reservation management function executed by the control device 10 of the present embodiment, the shared vehicle selection function will be described. The control device 10 uses the shared vehicle selection function to select a shared vehicle Vn that meets the user's desired condition. For example, when the user's application for use is a use application with which the user desires to start use of the shared vehicle Vn immediately after the application, the control device 10 accesses the database 30 to execute the following processing.

First, the control device 10 extracts shared vehicles Vn of a vehicle type which the user desires from among the currently available shared vehicles Vn. Then, the control device 10 selects a shared vehicle Vn that can arrive at the departure place by the use start time from among the extracted shared vehicles Vn. For example, the control device 10 selects a shared vehicle Vn located at the closest distance from the current position of the user. This allows for selection of a shared vehicle Vn that can be used immediately and that can arrive at the departure place by the use start time. When the user's application for use is an application for use on a designated date and time, the control device 10 selects a shared vehicle Vn that can arrive at the departure place by the use start time of the designated day.

Next, in the reservation management function executed by the control device 10 of the present embodiment, the notification function will be described. The control device 10 uses the notification function to communicate with the user terminal device 400A and display the reservation completion information on the display device 430 of the user terminal device 400A, thereby notifying the user of necessary information. Examples of the reservation completion information include information on the departure place and destination of the reserved shared vehicle Vn, information on the time when the reserved shared vehicle Vn arrives at the departure place (information on the use start time of the shared vehicle Vn), and other similar information. In the above-described example, the control device 10 transmits the reservation completion information to the user terminal device 400A when the shared vehicle Vn is present which can be used immediately and which can arrive at the departure place by the use start time.

There may be a case in which the user who confirmed the reservation completion information desires to cancel the use application for a certain reason. The reservation completion information may therefore include information with which the user's application for use can be canceled. When there is no shared vehicle Vn that meets the user's desired condition, the control device 10 transmits information indicating that reservation cannot be made and information on an alternative shared vehicle Vn to the user terminal device 400A.

In the present embodiment, the control device 10 treats the timing at which the user is notified of the reservation completion information as the completion of reservation of the shared vehicle Vn. The case has been described in which the condition that the control device 10 notifies the user of the reservation completion information is a condition that the user selects the shared vehicle Vn which meets the user's desired condition, but the present invention is not limited to this. For example, another configuration may be employed in which the reservation of the shared vehicle Vn is completed after receiving information from the user that the user completes the reservation of the shared vehicle Vn. Still another configuration may be as follows. For example, before notifying the reservation completion information, the control device 10 may preliminarily notify the user of information regarding the shared vehicle Vn to be designated. The information which is preliminarily notified has the same content as the reservation completion information. Then, when the user determines that the preliminarily notified information is not problematic, the shared vehicle management apparatus 100 may be notified that the user desires to complete the reservation.

Next, in the ride-sharing management function executed by the control device 10 of the present embodiment, the travel route calculation function will be described. The control device 10 uses the travel route calculation function to calculate a travel route along which the reserved shared vehicle Vn travels. For example, the control device 10 accesses the map information 33 of the database 30 to calculate a travel route for the shared vehicle Vn to leave the departure place and arrive at the destination. The calculated travel route includes the name of a road on which the shared vehicle Vn travels, the name of an intersection through which the shared vehicle Vn passes, or the name of a facility by which the shared vehicle Vn passes. Any calculation process for a travel route known at the time of filing of the present application can be appropriately used for the travel route calculation process executed by the control device 10.

To transmit to other users than the user who uses the shared vehicle Vn, the control device 10 of the present embodiment calculates the travel route along which the reserved shared vehicle Vn travels, after the reservation of the shared vehicle Vn is completed. The control device 10 may transmit the calculated travel route to the user who uses the shared vehicle Vn.

Next, in the ride-sharing management function executed by the control device 10 of the present embodiment, the reservation information provision function will be described. The control device 10 uses the reservation information provision function to provide the reservation information of the shared vehicle Vn to other users than the user who uses the shared vehicle Vn. Specifically, the other users are those who have not applied for the use of a shared vehicle Vn to the shared vehicle management apparatus 100 when reservation of the shared vehicle Vn is completed. In other words, the other users are those who cannot know which time, which departure place, which travel route, and which destination the shared vehicle Vn having been reserved departs from, travels through, and arrives at. In the present embodiment, other users can be provided with the information regarding the reserved shared vehicle Vn after the reservation of the shared vehicle Vn is completed and before the use of the shared vehicle Vn is started. The other users can thus be provided with opportunities to share a ride on the shared vehicle Vn.

After the reservation of the shared vehicle Vn is completed, to provide other users with the reservation information of the shared vehicle Vn, the control device 10 uses the shared vehicle selection function to specify information regarding the reserved shared vehicle Vn. Then, the control device 10 transmits the specified information to the communication device 420 of the user terminal device 400A carried by each of the other users. For example, the control device 10 specifies the departure place and destination of the shared vehicle Vn, the time when the shared vehicle Vn arrives at the departure place (use start time of the shared vehicle Vn), and the travel route of the shared vehicle Vn, as the reservation information of the shared vehicle Vn. Examples of the form of displaying the travel route of the shared vehicle Vn include a route map that represents the travel route.

After specifying the reservation information of the shared vehicle Vn, the control device 10 accesses the user information 34 of the database 30 to extract other users than the user who requests use of the shared vehicle Vn as objects to be provided with the reservation information. In the present embodiment, the control device 10 treats all the users other than the user who requests use of the shared vehicle Vn as other users. Through this operation, in the present embodiment, the other users can check the reservation information of the shared vehicle Vn thereby to confirm the schedule of the shared vehicle Vn before the use of the shared vehicle Vn is started. Specifically, the other users can know which time, which departure place, which travel route, and which destination the reserved shared vehicle Vn departs from, travels through, and arrives at. In addition, the other users can know the usage situation of the shared vehicle Vn without requesting use of the shared vehicle Vn and, therefore, opportunities to share a ride on the shared vehicle Vn increase.

Figure 2:
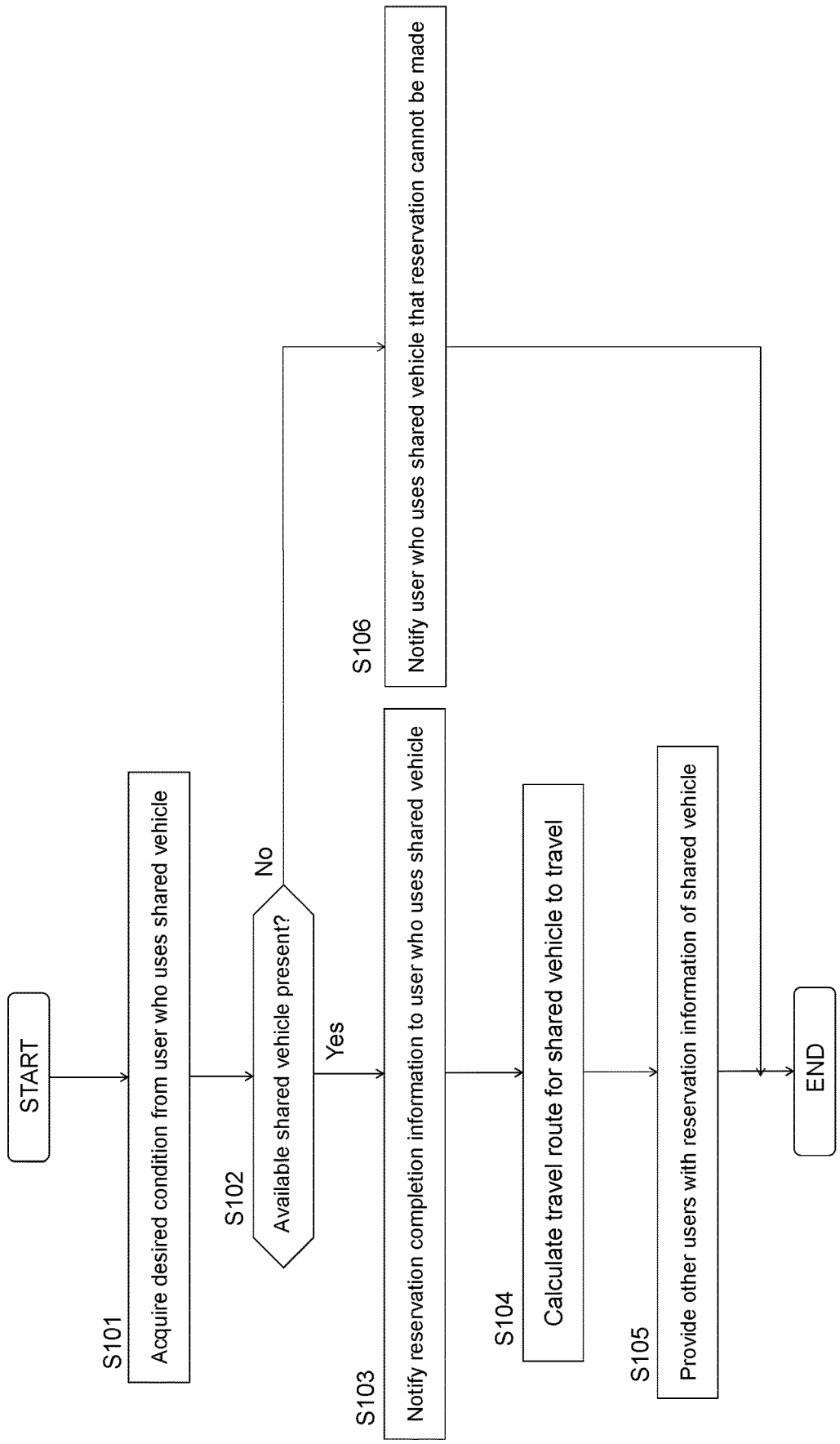
FIG. 2 is a flowchart illustrating a control procedure of a car sharing system executed by the information providing apparatus according to the first embodiment.

FIG. 2 is a flowchart illustrating a control procedure of the shared vehicle management system of the present embodiment. With reference to the flowchart of FIG. 2, the control process of the shared vehicle management system of the present embodiment will be described. The flowchart illustrated in FIG. 2 represents a control procedure in which a user transmits a use request to the shared vehicle management apparatus 100 to use a shared vehicle V1 and other users are then provided with the reservation information of the shared vehicle V1.

In step S101, the control device 10 of the shared vehicle management apparatus 100 acquires a use request for a shared vehicle V1 from a user via the user terminal device 400A. The use request includes the ID information of the user and information on the ID of the shared vehicle V1 which the user expects to use, the use start time when the user desires to start use of the shared vehicle V1, the departure place which is a location at which the user desires to get on the shared vehicle V1, and the destination which is a location at which the user desires to get off the shared vehicle V1, as the desired condition when using the shared vehicle V1. In this case, the departure place may be the current position of the user (e.g., home). The current position of the user may be newly acquired concurrently with the use request or may also be a current position that has been preliminarily acquired if it cannot be acquired concurrently with the use request. The use start time may be represented by a condition such as an "immediate use (within 5 minutes)" or a "use within 30 minutes." This is equivalent to the use start time with which the user allows the use of service to be delayed. The control device 10 controls the database 30 to store the use request together with the information on the received time (reservation time).

In step S102, the control device 10 determines whether or not there is a shared vehicle that meets the desired condition acquired in step S101. In the above-described example, the desired condition includes a condition that the user desires to use a shared vehicle V1, so the control device 10 determines whether or not the shared vehicle V1 can arrive at the departure place by the use start time. When determining that the shared vehicle V1 can arrive at the departure place by the use start time, the control device 10 determines that the shared vehicle V1 is available. When the shared vehicle V1 is available, the process proceeds to step S103, while when the shared vehicle V1 is not available, the process proceeds to step S106.

When, in step S101, the user has not preliminarily specified a shared vehicle Vn and the desired condition does not include the information on the desired vehicle type, the control device 10 selects an available shared vehicle Vn. For example, the control device 10 accesses the shared vehicle information 31 of the database 30 to select a shared vehicle Vn located at the closest distance to the departure place. When an available shared vehicle Vn is selected, the process proceeds to step S103, while when an available shared vehicle Vn is not selected, the process proceeds to step S106.

In step S103, the control device 10 notifies the reservation completion information to the user who has made the use request in step S101. The reservation completion information includes information on the departure place and destination of the reserved shared vehicle V1 and information on the time when the reserved shared vehicle V1 arrives at the departure place.

In step S104, the control device 10 calculates a travel route along which the shared vehicle V1 having been reserved in step S103 travels. The control device 10 calculates the travel route for the shared vehicle V1 to leave the departure place and arrive at the destination.

In step S105, the control device 10 provides the reservation information of the shared vehicle V1 having been reserved in step S103 to other users than the user who made the use request in step S101, and ends the control process. The reservation information of the shared vehicle V1 includes information on the departure place and destination of the shared vehicle V1, the use start time, and the travel route calculated in step S104.

When, in step S102, there is no available shared vehicle, the process proceeds to step S106. In the above-described example, when the shared vehicle V1 is not available, the process proceeds to step S106. In step S106, the control device 10 notifies the user, who has made the use request in step S101, of information indicating that the reservation cannot be made, and ends the control process.

As described above, in the shared vehicle management system including the information providing apparatus of the present embodiment, the shared vehicle management apparatus 100 acquires a desired condition when using a shared vehicle Vn from a user who uses the shared vehicle Vn. Then, the shared vehicle management apparatus 100 determines whether or not the shared vehicle Vn can be reserved, on the basis of the acquired desired condition. When the reservation of the shared vehicle Vn is completed, the shared vehicle management apparatus 100 provides the reservation information of the shared vehicle Vn, which includes the destination of the reserved shared vehicle Vn, to other users than the user who made the use request for the shared vehicle Vn. Through this operation, the users other than the user who uses the shared vehicle Vn can confirm the information regarding the shared vehicle Vn before the use of the shared vehicle Vn is started. For example, when there is a user who desires to move in the same direction as that of the destination of the shared vehicle Vn among the other users who confirmed the reservation information of the shared vehicle Vn, this user can share a ride on the shared vehicle Vn to move to the desired destination. In this case, the user is given the opportunity to share a ride on the shared vehicle Vn and, as a result, the number of users of ride-sharing can readily increase.

Moreover, in the present embodiment, the shared vehicle management apparatus 100 acquires the boarding location at which the user gets on the shared vehicle Vn and the deboarding location at which the user gets off the shared vehicle Vn as the desired condition from the user who uses the shared vehicle Vn. Then, the shared vehicle management apparatus 100 calculates the travel route of the shared vehicle Vn on the basis of the acquired boarding location and deboarding location. The shared vehicle management apparatus 100 provides the reservation information of the shared vehicle Vn including the calculated travel route to other users than the user who uses the shared vehicle Vn. This allows the other users to confirm which kind of travel route the shared vehicle Vn travels, and the other users as such can determine whether or not they can share a ride on the shared vehicle Vn.

Furthermore, in the present embodiment, the shared vehicle management apparatus 100 acquires the use start time for starting use of the shared vehicle Vn as the desired condition from the user who uses the shared vehicle Vn. Then, the shared vehicle management apparatus 100 provides the reservation information of the shared vehicle Vn including the boarding location, the deboarding location, and the use start time to other users other than the user who uses the shared vehicle Vn. This allows the other users to confirm which time and which places the shared vehicle Vn moves to depart from and arrive at. Thus, similar effects to the above-described effects can be obtained.

In the above-described embodiment, the configuration has been exemplified in which the travel route of the reserved shared vehicle Vn is included in the reservation information of the shared vehicle Vn, but the present invention is not limited to this. For example, the shared vehicle management apparatus 100 may provide other users with the reservation information of shared vehicle Vn including only the destination of shared vehicle Vn. Then, the other users who have checked the reservation information may access the shared vehicle management apparatus 100 to confirm the travel route of the shared vehicle Vn.

Second Embodiment

An example will then be described for the case in which the information providing apparatus according to the present invention different from the above-described embodiment is applied to a shared vehicle management system 2. The shared vehicle management system 2 of the present embodiment has the same configuration as that of the shared vehicle management system 1 of the above-described embodiment except that the shared vehicle management system 2 includes a shared vehicle management apparatus 120. Accordingly, the description made in the above-described embodiment will be borrowed herein for the same configuration.

The shared vehicle management apparatus 120 of the present embodiment has the same configuration as that of the shared vehicle management apparatus 100 of the above-described embodiment except that the shared vehicle management apparatus 120 includes a control device 40. Accordingly, the description made in the above-described embodiment will be borrowed herein for the same configuration.

The ride-sharing management function of the control device 40 of the present embodiment includes a ride-sharing application function and a ride-sharing determination function in addition to the travel route calculation function and the reservation information provision function.

In the ride-sharing management function executed by the control device 40 of the present embodiment, the ride-sharing application function will be described. The control device 40 uses the ride-sharing application function to add information with which other users can apply for ride-sharing to the information (reservation information of the shared vehicle V) regarding the reserved shared vehicle Vn, thereby providing the other users with opportunities to readily apply for ride-sharing.

Figure 3A:
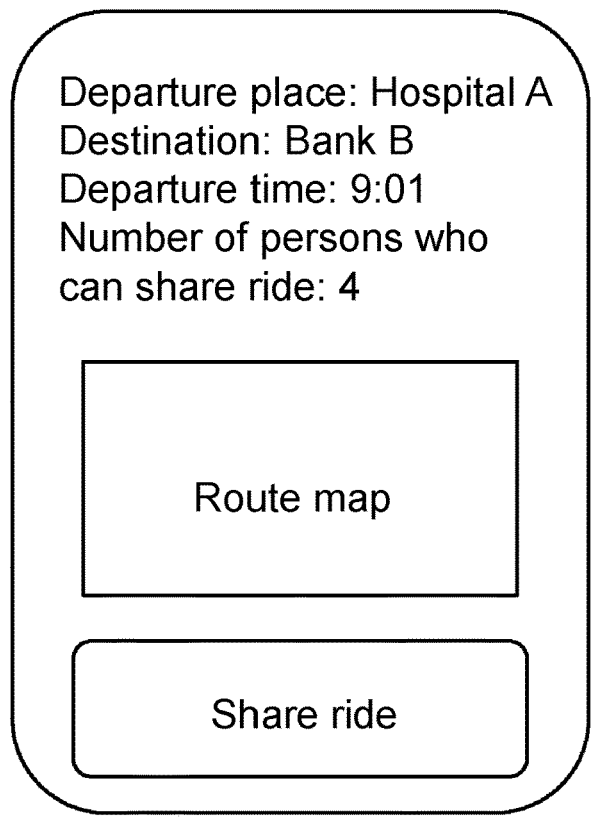
FIGS. 3A and 3B illustrate an example of a set of information items which the information providing apparatus provides to users.

For example, the control device 40 displays the reservation information of the shared vehicle Vn as illustrated in FIG. 3A on the display device 430 of the user terminal device 400A carried by another user. FIG. 3A is a view illustrating an example of the reservation information of the shared vehicle Vn which the control device 40 provides. In the example of FIG. 3A, the reservation information is indicated such that the departure place of the reserved shared vehicle Vn is "Hospital A," the destination of the shared vehicle Vn is "Bank B," the time when the shared vehicle Vn leaves the hospital A is "9:01," and the number of persons who can share a ride on the shared vehicle Vn is "4." In addition, the travel route for the shared vehicle Vn to travel is indicated as "Route map." For example, the "Route map" is linked to the map information, and the user touches the "Route map" thereby to allow the user to be presented with the travel route of the shared vehicle Vn on another screen than the screen illustrated in FIG. 3A. FIG. 3A illustrates an example of a set of information items which the information providing apparatus provides to users.

In the example of FIG. 3A, the information with which another user can apply for ride-sharing on the shared vehicle Vn is indicated as "Share ride." Examples of the component for indicating and inputting "Share ride" include a touch panel-type button capable of communicating with the shared vehicle management apparatus 120. For example, when the user touches "Share ride," the user terminal device 400A transmits, to the shared vehicle management apparatus 120, information indicating that the user applies for ride-sharing on the reserved shared vehicle Vn. The information transmitted to the shared vehicle management apparatus 120 also includes the current positional information of the user.

FIG. 3A illustrates an example of the reservation information of the shared vehicle Vn, and the present invention is not limited to this. For example, the reservation information of the shared vehicle Vn may include the vehicle type of the shared vehicle Vn, the color of the shared vehicle Vn, the number plate number of the shared vehicle Vn, and other similar information.

The reservation information of the shared vehicle Vn may include information regarding users who use the shared vehicle Vn. For example, in the database 30, information (user evaluation) regarding the evaluation of users who have used the shared vehicle Vn may be stored for each user. The user evaluation refers to evaluation results when users who have shared a ride on the shared vehicle Vn evaluate users who have used the shared vehicle Vn. The shared vehicle management apparatus 120 can provide the user evaluation to other users by including the user evaluation in the reservation information of the shared vehicle Vn. This allows the other users to confirm which type of user the user who uses the shared vehicle Vn is, and can use the user evaluation as determination criteria when applying for ride-sharing. For example, a highly evaluated user is more likely to apply for ride-sharing and, as a result, the number of users of ride-sharing can readily increase.

In the ride-sharing management function executed by the control device 40 of the present embodiment, the ride-sharing determination function will be described. The control device 40 uses the ride-sharing determination function to determine whether or not the ride-sharing on the reserved shared vehicle V is possible, for the application for ride-sharing. When determining that the ride-sharing is possible, the control device 40 provides the sharing reservation information to the user who has applied for the ride-sharing. On the other hand, when determining that the ride-sharing is not possible, the control device 40 notifies the user who has applied for the ride-sharing that the ride-sharing is not possible.

Specifically, first, when acquiring the application for ride-sharing via the communication device 20, the control device 40 accesses the shared vehicle information 31 of the database 30 to specify the number of persons who can share a ride on the reserved shared vehicle Vn. For example, when the reserved shared vehicle Vn is a five-seater, the control device 40 specifies the number of persons who can share a ride as four except the person who uses the shared vehicle Vn (e.g., one person). Then, the control device 40 receives the application for ride-sharing in the order of reception and determines that the users who have applied for ride-sharing can share a ride unless the number of persons who can share a ride becomes zero. When determining that the ride-sharing is possible, the control device 40 accesses the database 30 to decrement the number of persons who can share a ride on the reserved shared vehicle Vn. When receiving the application for ride-sharing after the number of persons who can share a ride becomes zero, the control device 40 determines that the user who has applied for the ride-sharing cannot share a ride.

Next, to the users for whom a determination has been made that the ride-sharing is possible, the control device 40 notifies information indicating that the ride-sharing is possible and information regarding the ride-sharing as the ride-sharing reservation information. The information regarding the ride-sharing includes the boarding location at which a user who has applied for ride-sharing gets on the shared vehicle Vn and the time when the shared vehicle Vn arrives at the boarding location. The control device 40 specifies the boarding location suitable for the shared vehicle Vn from the current positional information of the user who has applied for the ride-sharing. For example, the control device 40 specifies a location on the travel route of the shared vehicle Vn, to which the moving distance from the current position of the user who has applied for ride-sharing is the shortest distance, as the boarding location. In addition, the control device 40 calculates the time when the shared vehicle Vn arrives at the specified boarding location.

Figure 3B:
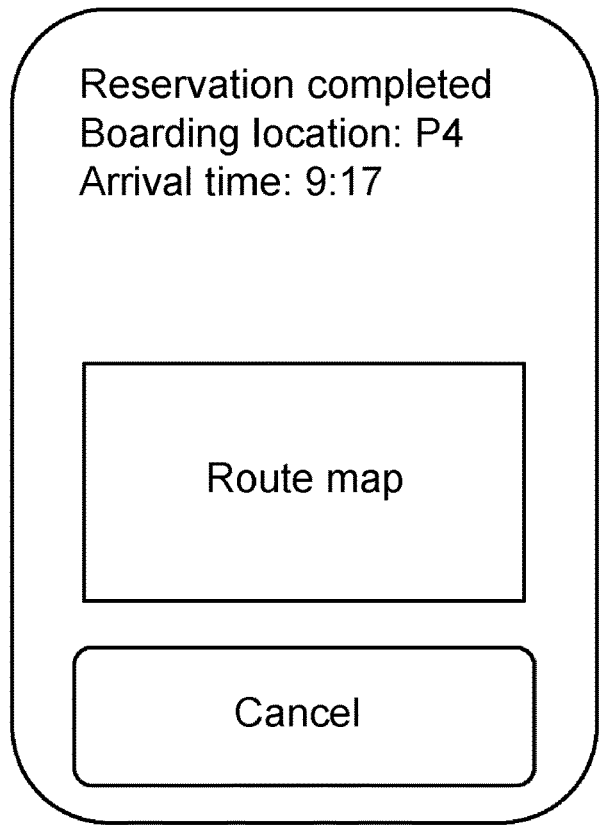

For example, the control device 40 displays the ride-sharing reservation information as illustrated in FIG. 3B on the display device 430 of the user terminal device 400A carried by another user. FIG. 3B is a view illustrating an example of the ride-sharing reservation information transmitted by the control device 40. In the example of FIG. 3B, the ride-sharing reservation information is indicated such that the information that the ride-sharing is possible is "Reservation completed," the boarding location at which a user who has applied for ride-sharing gets on the shared vehicle Vn is "P4" and the time when the shared vehicle Vn arrives at the boarding location P4 is "9:17." The boarding location P4 is a location on the travel route of the shared vehicle Vn.

On the other hand, to the users for whom a determination has been made that the ride-sharing is not possible, the control device 40 notifies that the ride-sharing is not possible.

In the present embodiment, the control device 40 uses the ride-sharing application function to restrict a period within which a user can apply for ride-sharing (ride-sharing application period). The control device 40 can set the ride-sharing application period on the basis of the reservation information of the shared vehicle Vn. For example, when the user desires to use the shared vehicle Vn immediately after requesting the use of the shared vehicle Vn, the time from the current time to the time when the reserved shared vehicle Vn starts to travel is short. In this case, if the ride-sharing application period is set to a relatively long period, at the time point when another user applies for ride-sharing, the shared vehicle Vn may possibly pass around the position of that user who has applied for the ride-sharing. To avoid such a situation, the control device 40 can set an appropriate ride-sharing application period in accordance with the use start time of the reserved shared vehicle Vn. For example, the control device 40 sets a time period until the use start time of the shared vehicle Vn as the ride-sharing application period. This allows the user who has applied for the ride-sharing to be notified of the result of the application before the shared vehicle Vn starts to travel.

When the ride-sharing application period has elapsed, the control device 40 ends the reception for the application for ride-sharing. If a user applies for ride-sharing after the ride-sharing application period has elapsed, the control device 40 notifies the user who applies for ride-sharing that the ride-sharing application period has passed.

Figure 4:
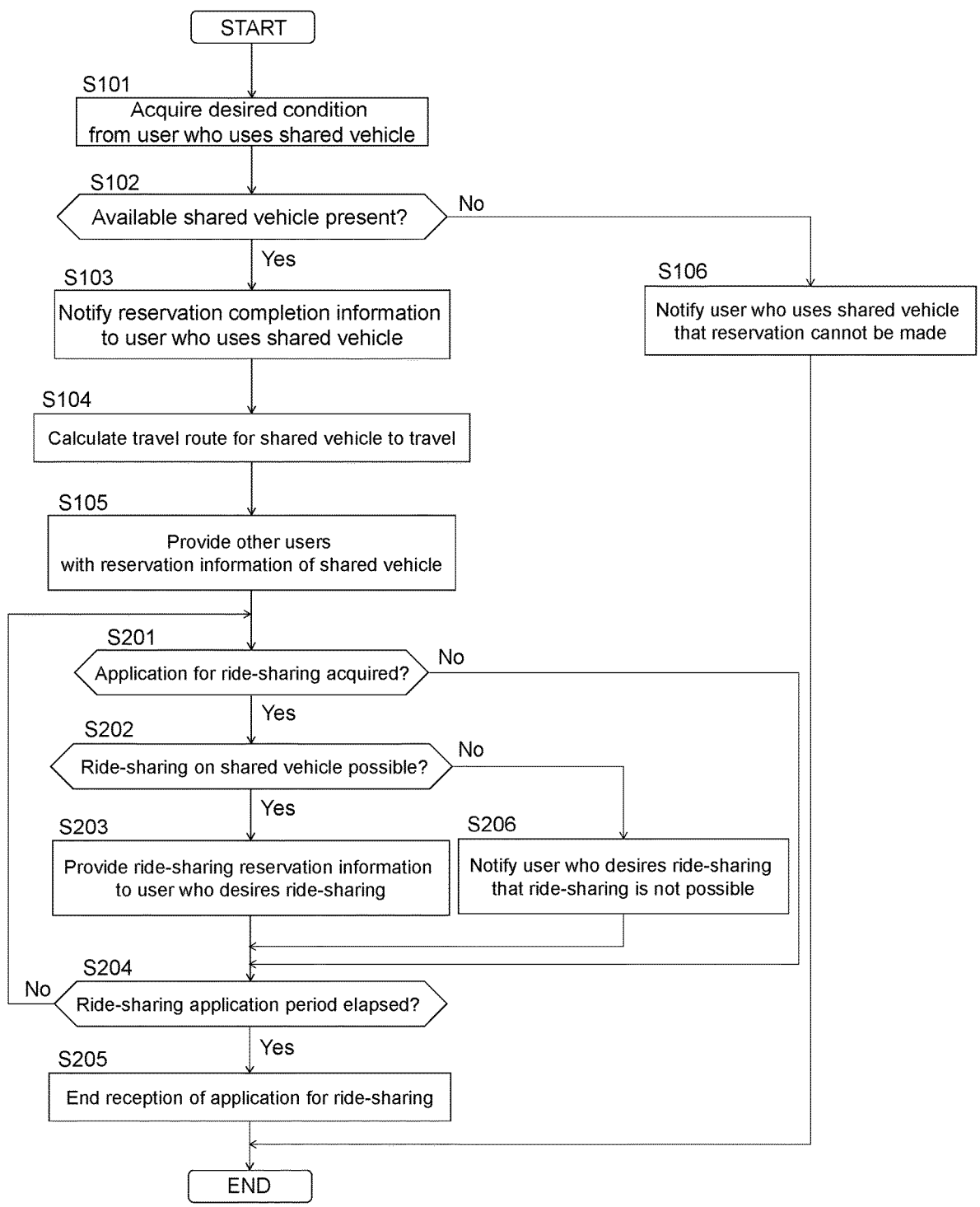
FIG. 4 is a flowchart illustrating a control procedure of a car sharing system executed by the information providing apparatus according to a second embodiment.

FIG. 4 is a flowchart illustrating a control procedure of the shared vehicle management system of the present embodiment. With reference to the flowchart of FIG. 4, the control process of the shared vehicle management system of the present embodiment will be described. The flowchart illustrated in FIG. 4 represents a control procedure (flowchart illustrated in FIG. 2) in which a user transmits a use request to the shared vehicle management apparatus 120 to use a shared vehicle V1 and other users are then provided with the reservation information of the shared vehicle V1, and a control procedure in which another user provided with the reservation information of the shared vehicle V1 applies for ride-sharing on the shared vehicle V1 and the reception of application for ride-sharing is then ended. In FIG. 4, the same steps as those in FIG. 2 are denoted by the same symbols as in FIG. 2 and, for the same steps as those in FIG. 2, the description made in the above-described embodiment will be borrowed herein.

In step S105, the control device 40 provides the reservation information of the shared vehicle V1 to other users than the user who uses the shared vehicle V1, and this step is followed by step S201.

In step S201, the control device 40 determines whether or not an application for ride-sharing is acquired from another user. For example, as illustrated in FIG. 3A, the other user can apply for ride-sharing on the shared vehicle V1 by touching the indication of "Share ride" displayed on the display device 430 of the user terminal device 400A. When the application for ride-sharing is acquired, the process proceeds to step S202, while when the application for ride-sharing is not acquired, the process proceeds to step S204.

In step S202, the control device 40 determines whether or not the ride-sharing on the shared vehicle V1 is possible. For example, the control device 40 receives the application for ride-sharing in the order of reception and determines that the user who has applied for ride-sharing can share a ride unless the number of persons who can share a ride on the shared vehicle becomes zero. On the other hand, when receiving the application for ride-sharing after the number of persons who can share a ride on the shared vehicle becomes zero, the control device 40 determines that the user who has applied for the ride-sharing cannot share a ride. When a determination is made that the ride-sharing is possible, the process proceeds to step S203, while when a determination is made that the ride-sharing is not possible, the process proceeds to step S206.

In step S203, the control device 40 provides the ride-sharing reservation information to the user, who has applied for the ride-sharing, via the user terminal device 400A. As illustrated in FIG. 3B, the ride-sharing reservation information includes information indicating that the ride-sharing is possible, the boarding location at which the user who has applied for the ride-sharing gets on the shared vehicle V1, and the time when the shared vehicle V1 arrives at the boarding location.

In step S204, the control device 40 determines whether or not the ride-sharing application period has elapsed. For example, the control device 10 sets a time period until the use start time of the shared vehicle V1 as the ride-sharing application period. When the ride-sharing application period has elapsed, the process proceeds to step S205, while when the ride-sharing application period has not elapsed, the process returns to step S201.

In step S205, the control device 40 ends the reception of the application for ride-sharing and concludes the control process.

When a determination is made in step S202 that the ride-sharing is not possible, the process proceeds to step S206. In step S206, the control device 40 notifies, via the user terminal device 400A, the user who has applied for ride-sharing that the ride-sharing is not possible. Step S206 is followed by step S204.

As described above, in the present embodiment, when the reservation of the shared vehicle Vn is completed, the shared vehicle management apparatus 120 provides another user with the application information with which the other user can apply for ride-sharing on the shared vehicle Vn. This allows the other user to readily apply for the ride-sharing on the reserved shared vehicle Vn and, as a result, the number of users of ride-sharing can readily increase.

Moreover, in the present embodiment, the shared vehicle management apparatus 120 sets the ride-sharing application period to a predetermined period thereby to restrict the application for ride-sharing by another user within the predetermined period. This can prevent the user, who has applied for the ride-sharing, from being notified that the ride-sharing is possible although the shared vehicle Vn has passed around the user.

In the above-described embodiment, the configuration has been exemplified in which the ride-sharing reservation information includes the information on the boarding location at which the user who has applied for the ride-sharing gets on the shared vehicle Vn and the time when the shared vehicle Vn arrives at the boarding location, but the present invention is not limited to this. For example, the shared vehicle management apparatus 120 may provide the ride-sharing reservation information, which includes only the information indicating that the ride-sharing is possible, to the user who has applied for the ride-sharing. Then, the user who has checked the ride-sharing reservation information may access the shared vehicle management apparatus 120 to confirm the boarding location and the time when the shared vehicle Vn arrives at the boarding location.

Third Embodiment

An example will then be described for the case in which the information providing apparatus according to the present invention different from the above-described embodiments is applied to a shared vehicle management system 3. The shared vehicle management system 3 of the present embodiment has the same configuration as that of the shared vehicle management system 1 of the above-described embodiment except that the shared vehicle management system 3 includes a shared vehicle management apparatus 130. Accordingly, the description made in the above-described embodiments will be borrowed herein for the same configuration.

The shared vehicle management apparatus 130 of the present embodiment has the same configuration as that of the shared vehicle management apparatus 100 of the above-described embodiment except that the shared vehicle management apparatus 130 includes a control device 50. Accordingly, the description made in the above-described embodiments will be borrowed herein for the same configuration.

The ride-sharing management function of the control device 50 of the present embodiment includes a user specifying function in addition to the travel route calculation function and the reservation information provision function.

In the ride-sharing management function executed by the control device 50 of the present embodiment, the user specifying function will be described. When the reservation of the shared vehicle Vn is completed, the control device 50 uses the user specifying function to preliminarily specify another user to be provided with the reservation information of the shared vehicle Vn, on the basis of a predetermined condition.

The control device 50 of the present embodiment specifies the user who can share a ride on the reserved shared vehicle Vn as another user on the basis of the positional information of all the users and the reservation information of the shared vehicle Vn. First, the control device 50 accesses the user information 34 of the database 30 to acquire the current positional information of all the users other than the user who has reserved the shared vehicle Vn. On the assumption that the current positional information of all the users and the reservation information (the departure place, the destination, the travel route, and the use start time) of the reserved shared vehicle Vn are perceived, the control device 50 specifies one or more users who can share a ride on the shared vehicle Vn.

Next, with reference to FIG. 5, a method based on the shortest distance from the current position of a user to the travel route of the reserved shared vehicle Vn will be described as an example of a method of specifying the users who can share a ride.

Figure 5:
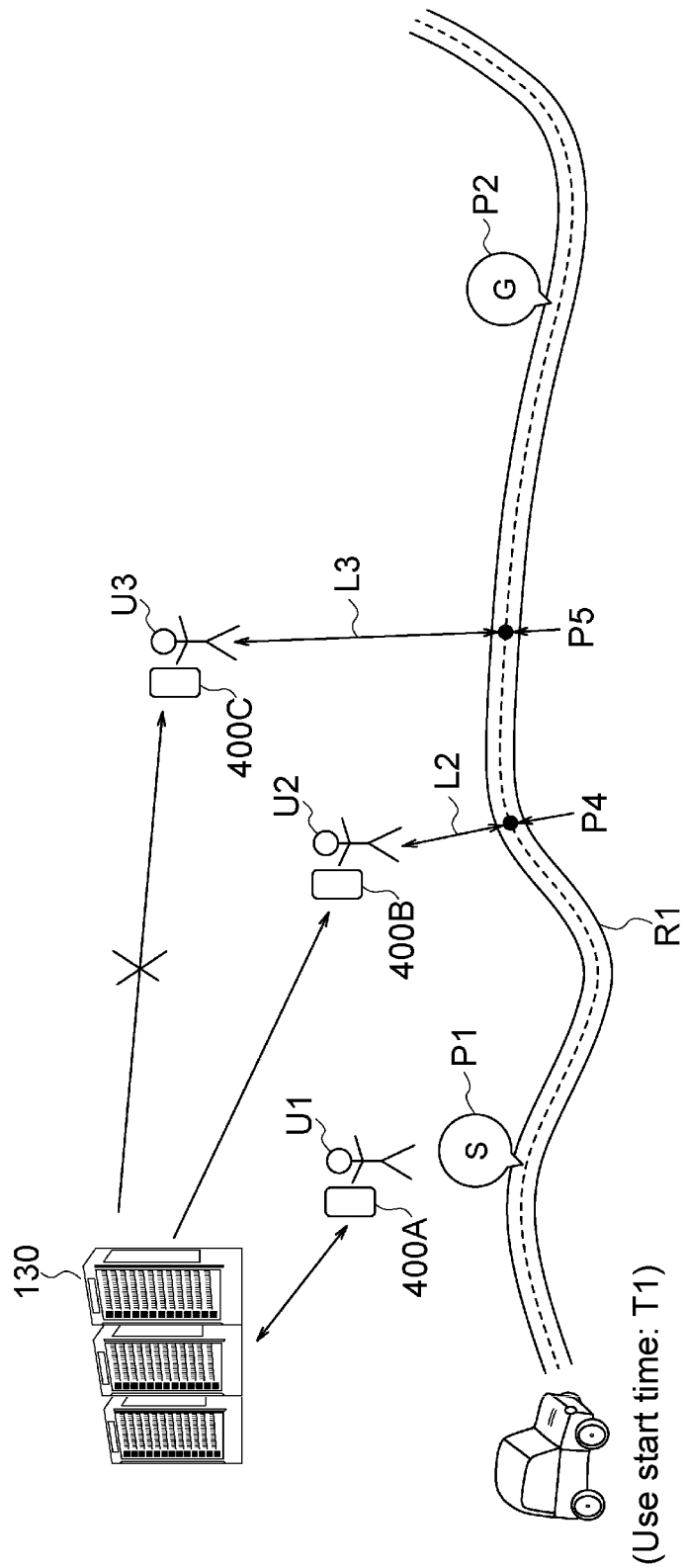
FIG. 5 is a diagram for describing an example of a method of specifying users who can share a ride on a shared vehicle.

FIG. 5 is a diagram for describing an example of a method of specifying users who can share a ride on the shared vehicle V1. FIG. 5 illustrates a scene in which a user U1 uses the user terminal device 400A and expects to move from a departure place P1 set by the user U1 to a destination P2 using the shared vehicle V1 and the reservation of the shared vehicle V1 by the user U1 has been completed. In FIG. 5, users U2 and U3 are also present as objects to whom the shared vehicle management apparatus 130 provides the reservation information (the departure place P1, destination P2, travel route R1, and use start time T1) of the shared vehicle V1. In FIG. 5, it is assumed that the user U2 is located closer to the travel route R1 of the shared vehicle Vn than the user U3. The control device 50 determines whether or not the users U2 and U3 can share a ride on the shared vehicle V1.

In the example of FIG. 5, the control device 50 accesses the map information 33 of the database 30 to calculate the shortest distance L2 from the current position of the user U2 to the travel route R1 of the reserved shared vehicle V1. Then, the control device 50 determines whether or not the calculated shortest distance L2 is less than a predetermined distance. When the shortest distance L2 is less than the predetermined distance, the control device 50 determines that the user U2 can share a ride on the shared vehicle V1. On the other hand, when the shortest distance L2 is not less than the predetermined distance, the control device 50 determines that the user U2 cannot share a ride on the shared vehicle V1.

Also for the user U3, the control device 50 uses the above-described method to determine whether or not the user U3 can share a ride on the shared vehicle V1. In FIG. 5, it is assumed that the shortest distance L3 from the position of the user U3 to the travel route R1 is longer than the shortest distance L2 and is not less than the predetermined distance. In this case, the control device 50 determines that the user U3 cannot share a ride on the shared vehicle V1 because the shortest distance L3 is not less than the predetermined distance.

On the basis of the shortest distance to the travel route, the control device 50 determines for each user whether or not the user can share a ride on the shared vehicle Vn and specifies the user or users determined to be able to share a ride as other users to be provided with the reservation information of the shared vehicle Vn. In the example of FIG. 5, the control device 50 provides the reservation information of the shared vehicle V1 to the user U2 determined to be able to share a ride on the shared vehicle V1.

With reference to FIG. 5, a method based on a time (moving time) required for a user to move along the shortest distance from the current position of the user to the travel route of the reserved shared vehicle Vn will be described as another example of the method of specifying users who can share a ride.

First, whether or not the user U2 can share a ride will be described. In the example of FIG. 5, the control device 50 calculates the shortest distance L2 and also calculates the location on the travel route R1 corresponding to the shortest distance L2 as a boarding location P4 for the user U2. Then, the control device 50 reads out the average moving speed of users (e.g., average moving speed of pedestrians) from the user information 34 of the database 30. The control device 50 divides the shortest distance L2 by the read average moving speed of users to calculate the time required for the user U2 to move from the current position to the boarding location P4 as a first moving time $t_{U2}$.

In addition, the control device 50 uses the travel route calculation function to calculate the travel route R1 of the shared vehicle V1 and also calculates the required time for the shared vehicle V1 to travel along the travel route R1. Then, on the basis of the calculated required time, the control device 50 calculates the time required for the shared vehicle V1 to move from the current position to the boarding location P4 for the user U2 as a second moving time $t_{V1}$. For example, the control device 50 can calculate the second moving time $t_{V1}$ from the ratio of the distance of the travel route R1 and the distance to the boarding location P4.

On the basis of the first moving time $t_{U2}$, the control device 50 calculates a first arrival time $T_{U2\_P4}$ as the time when the user U2 arrives at the boarding location P4. The control device 50 adds the first moving time $t_{U2}$ to the current time to calculate the first arrival time $T_{U2\_P4}$.

In addition, on the basis of the use start time T1 and the second moving time $t_{V1}$, the control device 50 calculates a second arrival time $T_{V1\_P4}$ as the time when the shared vehicle V1 arrives at the boarding location P4. The control device 50 adds the second moving time $t_{V1}$ to the use start time T1 to calculate the second arrival time $T_{V1\_P4}$.

The control device 50 compares the first arrival time $T_{U2\_P4}$ with the second arrival time $T_{V1\_P4}$. When the first arrival time $T_{U2\_P4}$ is earlier than the second arrival time $T_{V1\_P4}$, the control device 50 determines that the user U2 can share a ride on the shared vehicle V1. On the other hand, when the first arrival time $T_{U2\_P4}$ is later than the second arrival time $T_{V1\_P4}$, the control device 50 determines that the user U2 cannot share a ride on the shared vehicle V1. In FIG. 5, it is assumed that the first arrival time $T_{U2\_P4}$ is earlier than the second arrival time $T_{V1\_P4}$, so the control device 50 determines that the user U2 can share a ride on the shared vehicle V1. A predetermined time (e.g., about 30 seconds to 60 seconds) may be added to these arrival times as the time until each user gets on the vehicle and the vehicle departs.

Thus, in another example of the method of specifying users who can share a ride, the control device 50 uses the travel route calculation function to calculate the travel route R1 of the shared vehicle V1 and also calculate the required time for the shared vehicle V1 to travel along the travel route R1. Through this operation, the user or users who can share a ride are specified on the basis of the time when the shared vehicle V1 actually arrives and, therefore, the determination can be made more accurately than the above-described method of specifying users who can share a ride with reference to the shortest distance to the travel route.

Also for the user U3, the control device 50 uses the above-described method to determine whether or not the user U3 can share a ride on the shared vehicle V1. In FIG. 5, it is assumed that the shortest distance L3 from the position of the user U3 to the travel route R1 is longer than the shortest distance L2. In this case, the control device 50 determines that the user U3 cannot share a ride on the shared vehicle V1 because a first arrival time $T_{U3\_P5}$ when the user U3 arrives at a boarding location P5 is later than a second arrival time $T_{V1\_P5}$ when the shared vehicle V1 arrives at the boarding location P5.

On the basis of the moving time to the travel route, the control device 50 determines for each user whether or not the user can share a ride on the shared vehicle Vn and specifies the user or users determined to be able to share a ride as other users to be provided with the reservation information of the shared vehicle Vn. In the example of FIG. 5, the control device 50 provides the reservation information of the shared vehicle V1 to the user U2 determined to be able to share a ride on the shared vehicle V1.

Figure 6:
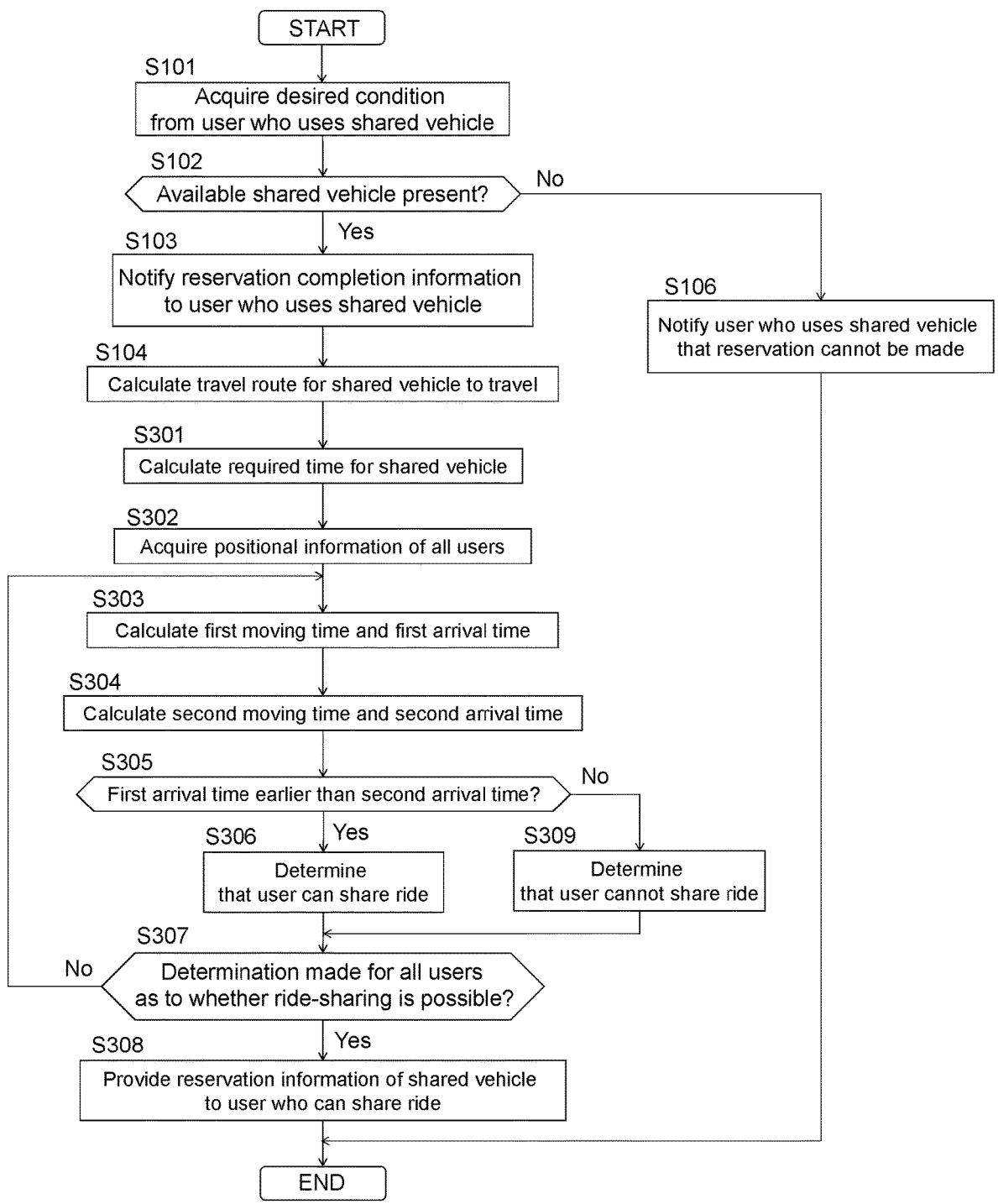
FIG. 6 is a flowchart illustrating a control procedure of a car sharing system executed by the information providing apparatus according to a third embodiment.

FIG. 6 is a flowchart illustrating a control procedure of the shared vehicle management system of the present embodiment. With reference to the flowchart of FIG. 6, the control process of the shared vehicle management system of the present embodiment will be described. The flowchart illustrated in FIG. 6 represents a control procedure in which a user transmits a use request to the shared vehicle management apparatus 130 to use a shared vehicle V1 and the reservation information of the shared vehicle V1 is then provided to a plurality of users who can share a ride. The flowchart of FIG. 6 includes a part of the flowchart of FIG. 2. In FIG. 6, the same steps as those in FIG. 2 are denoted by the same symbols as in FIG. 2 and, for the same steps as those in FIG. 2, the description made in the above-described embodiment will be borrowed herein.

In step S104, the control device 40 calculates the travel route of the shared vehicle V1, and this step is followed by step S301.

In step S301, the control device 50 calculates the required time for the shared vehicle V1 to travel along the travel route calculated in step S104.

In step S302, the control device 50 accesses the map information 33 of the database 30 to acquire the current positional information of all the users other than the user who made the use request in step S101. Examples of the current positional information include information on the latitude and longitude.

In step S303, the control device 50 calculates the shortest distance from the current position of a user to a location on the travel route on the basis of the current positional information of the user acquired in step S302 and the travel route calculated in step S104. Then, on the basis of the average moving speed of users stored in the user information 34 of the database 30 and the calculated shortest distance, the control device 50 calculates the first moving time as the time required for the user to move to the location on the travel route.

In step S303, on the basis of the calculated first moving time, the control device 50 calculates the first arrival time as the time when the user arrives at the location on the travel route. The control device 50 adds the first moving time to the current time to calculate the first arrival time.

In step S304, on the basis of the required time calculated in step S301, the control device 50 calculates the second moving time as the time required for the shared vehicle to move to the location on the travel route which gives the shortest distance from the current position of the user.

In step S304, on the basis of the use start time of the shared vehicle V1 and the calculated second moving time, the control device 50 calculates the second arrival time as the time when the shared vehicle arrives at the location on the travel route. The control device 50 adds the second moving time to the use start time to calculate the second arrival time.

In step S305, the control device 50 determines whether or not the first arrival time calculated in step S303 is earlier than the second arrival time calculated in step S304. When the first arrival time is earlier than the second arrival time, the process proceeds to step S306, while when the first arrival time is later than the second arrival time, the process proceeds to step S309.

In step S306, the control device 50 determines that the user targeted in steps S303 to S305 is a user who can share a ride on the shared vehicle V1.

In step S307, the control device 50 confirms whether determinations have been made for all the users as to whether or not the ride-sharing is possible. When the determinations for all the users are completed, the process proceeds to step S308, while when one or more users for which the determination is not completed remain, the process returns to step S303.

In step S308, the control device 50 provides the reservation information of the shared vehicle V1 to the users who can share a ride as specified in step S306, and ends the control process. When there is no user who can share a ride after the completion of step S307, the control device 50 also ends the control process.

When a determination is made in step S305 that the first arrival time is later than the second arrival time, the process proceeds to step S309. In step S309, the control device 50 determines that the user targeted in steps S303 to S305 is a user who cannot share a ride on the shared vehicle V1. Completion of step S309 is followed by step S307.

As described above, in the present embodiment, the shared vehicle management apparatus 130 makes determinations for all the users as to whether or not the ride-sharing on the shared vehicle Vn is possible, and specifies the user or users who can share a ride as other users to be provided with the reservation information of the shared vehicle Vn. Through this operation, it is not necessary for the other users to confirm the reservation information of a shared vehicle Vn that cannot be used for the ride-sharing. It is thus possible to prevent the other users from being bothered.

Moreover, in the present embodiment, the shared vehicle management apparatus 130 calculates the first arrival time, on the basis of the moving speed of the user, as the time when the user arrives at the predetermined location on the travel route after moving along the shortest distance from the current position to the predetermined location on the travel route. In addition, the shared vehicle management apparatus 130 calculates the second arrival time, on the basis of the required time and the use start time, as the time when the shared vehicle Vn arrives at the predetermined location on the travel route. Then, when the first arrival time is earlier than the second arrival time, the shared vehicle management apparatus 130 determines that the ride-sharing on the reserved shared vehicle Vn is possible. This allows the user or users, who can share a ride on the shared vehicle Vn, to be accurately determined.

Fourth Embodiment

An example will then be described for the case in which the information providing apparatus according to the present invention different from the above-described embodiments is applied to a shared vehicle management system 4. The shared vehicle management system 4 of the present embodiment has the same configuration as that of the shared vehicle management system 3 of the above-described embodiment except that the shared vehicle management system 4 includes a shared vehicle management apparatus 140. Accordingly, the description made in the above-described embodiments will be borrowed herein for the same configuration.

The shared vehicle management apparatus 140 of the present embodiment has the same configuration as that of the shared vehicle management apparatus 130 of the above-described embodiment except that the shared vehicle management apparatus 140 includes a control device 60. Accordingly, the description made in the above-described embodiments will be borrowed herein for the same configuration.

The ride-sharing management function of the control device 60 of the present embodiment includes a shared vehicle specifying function in addition to the travel route calculation function, the reservation information provision function, and the user specifying function.

In the ride-sharing management function executed by the control device 60 of the present embodiment, the shared vehicle specifying function will be described. When the reservation of a plurality of shared vehicles Vn is completed, the control device 50 uses the shared vehicle specifying function to extract a shared vehicle Vn on which the user can share a ride earliest from among the plurality of shared vehicles Vn, which have been reserved, and provide the reservation information of the extracted shared vehicle Vn to the user.

Next, a method of specifying a shared vehicle will be described with reference to FIG. 7.

Figure 7:
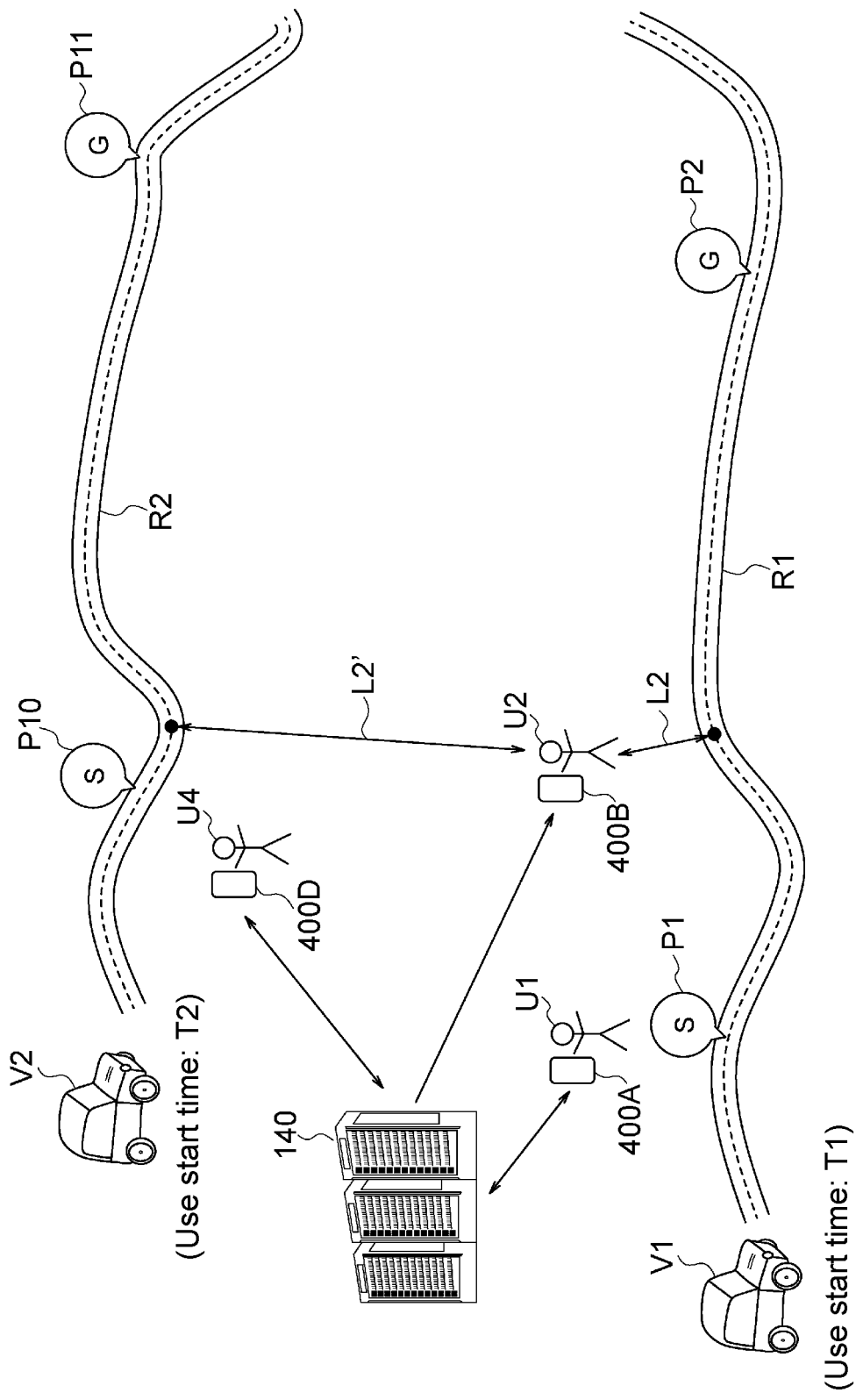
FIG. 7 is a diagram for describing an example of a method of specifying a shared vehicle which a user can share a ride earliest when reservation of a plurality of shared vehicles is completed.

FIG. 7 is a diagram for describing an example of a method of specifying a shared vehicle on which the user can share a ride earliest when the reservation of a plurality of shared vehicles is completed. FIG. 7 illustrates a scene in which a user U1 uses the user terminal device 400A and expects to move from a departure place P1 set by the user U1 to a destination P2 using a shared vehicle V1 and the reservation of the shared vehicle V1 by the user U1 has been completed. This scene is also a scene in which a user U4 uses the user terminal device 400D and expects to move from a departure place P10 set by the user U4 to a destination P11 using a shared vehicle V2 and the reservation of the shared vehicle V2 by the user U4 has been completed. In FIG. 7, it is assumed that the destination P2 of the shared vehicle V1 and the destination P11 of the shared vehicle V2 are in the same direction.

In FIG. 7, a user U2 is also present as an object to whom the shared vehicle management apparatus 140 provides the reservation information (the departure place P1, destination P2, travel route R1, and use start time T1) of the shared vehicle V1 or the reservation information (the departure place P10, destination P11, travel route R2, and use start time T2) of the shared vehicle V2. In FIG. 7, it is assumed that the current position of the user U2 is closer to the travel route R1 than to the travel route R2 if the user U2 moves to these routes.

In the example of FIG. 7, the control device 60 accesses the map information 33 of the database 30 to calculate a shortest distance L2 from the current position of the user U2 to the travel route R1 of the reserved shared vehicle V1. The control device 60 also calculates a shortest distance L2' from the current position of the user U2 to the travel route R2 of the reserved shared vehicle V2.

On the basis of the two calculated shortest distances, the control device 60 determines which travel route the user U2 can move to for earlier ride-sharing on the shared vehicle Vn. For example, the control device 60 compares the shortest distance L2 with the shortest distance L2'. In the case in which the shortest distance L2 is shorter, the control device 60 determines that the user U2 can share a ride earlier when moving to the travel route R1, and provides the user U2 with the reservation information of the shared vehicle V1. On the other hand, in the case in which the shortest distance L2' is shorter, the control device 60 determines that the user U2 can share a ride earlier when moving to the travel route R2, and provides the user U2 with the reservation information of the shared vehicle V2. In the example of FIG. 7, the control device 60 provides the user U2 with the reservation information of the shared vehicle V1 because the shortest distance L2 is shorter than the shortest distance L2'.

The method of specifying a shared vehicle may be based on the earliest time when the user arrives at the travel route rather than the shortest distance to the travel route. The control device 60 compares the time when the user U2 can share a ride on the shared vehicle V1 with the time when the user U2 can share a ride on the shared vehicle V2, thereby to specify a shared vehicle on which the user U2 can share a ride earlier.

When a difference of a predetermined time or more occurs between the use start time T1 and the use start time T2, the method of specifying a shared vehicle may be based on the time at which the user can get on the shared vehicle earliest. In the example of FIG. 7, provided that the use start time T1 of the shared vehicle V1 is later than the use start time T2 of the shared vehicle V2, it is conceivable that when moving to the travel route R2, the user U2 can share a ride on the shared vehicle V2 at an earlier time than when sharing a ride on the shared vehicle V1. The control device 60 may compare the time when the user U2 gets on the shared vehicle V1 with the time when the user U2 gets on the shared vehicle V2 and provide the user U2 with the reservation information of the shared vehicle Vn which the user U2 can get on earlier.

The example of FIG. 7 exemplifies the case in which the number of the shared vehicles Vn having been reserved is two, but the present invention is not limited to this. For example, when the reservation of three or more shared vehicles Vn is completed, the control device 60 extracts the shared vehicle on which the user can share a ride earliest from among all the reserved shared vehicles Vn. Then, the control device 60 provides the user with the reservation information of the extracted shared vehicle Vn.

The example of FIG. 7 exemplifies the case in which the destination P2 of the shared vehicle V1 and the destination P11 of the shared vehicle V2 are in the same direction, but the present invention is not limited to this. For example, when the reservation of a plurality of shared vehicles Vn is completed, the control device 60 may group the plurality of the shared vehicles Vn having been reserved into some groups of shared vehicles with destinations in the same directions. Then, the control device 60 may extract a shared vehicle Vn on which the user can share a ride earliest from among the shared vehicles Vn included in a group.

Figure 8:
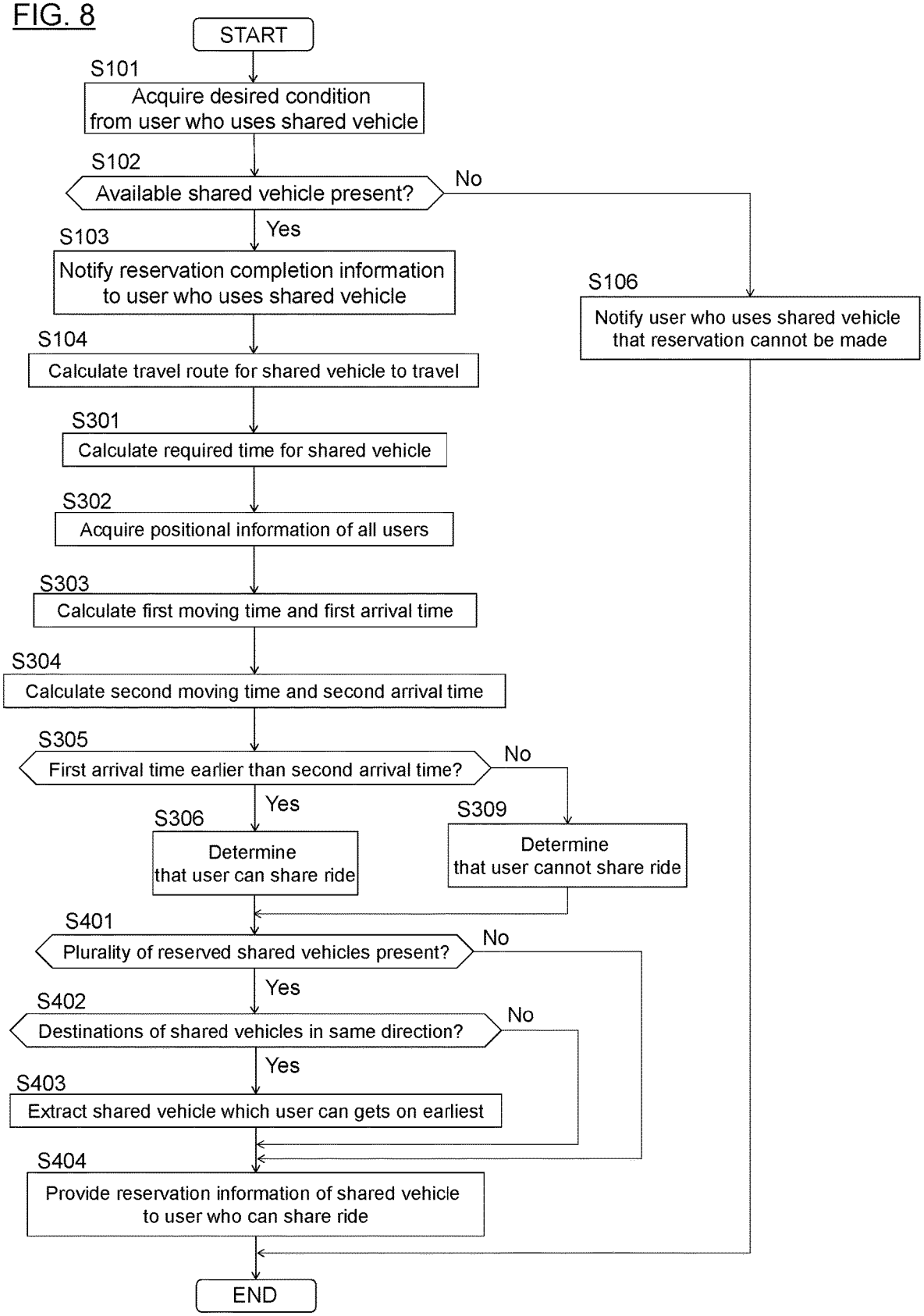
FIG. 8 is a flowchart illustrating a control procedure of a car sharing system executed by the information providing apparatus according to a fourth embodiment.

FIG. 8 is a flowchart illustrating a control procedure of the shared vehicle management system of the present embodiment. With reference to the flowchart of FIG. 8, the control process of the shared vehicle management system of the present embodiment will be described. The flowchart illustrated in FIG. 8 represents a control procedure in which two or more users transmit use requests to the shared vehicle management apparatus 140 to use two or more respective shared vehicles Vn and the reservation information of a shared vehicle Vn is then provided to a user who can share a ride. The flowchart of FIG. 8 includes a part of the flowcharts of FIGS. 2 and 6. In FIG. 8, the same steps as those in FIG. 2 or 6 are denoted by the same symbols as in FIG. 2 or 6 and, for the same steps as those in FIG. 2 or 6, the description made in the above-described embodiments will be borrowed herein.

In step S306, the control device 60 determines that the user targeted in steps S303 to S305 can share a ride, and this step is followed by step S401.

In step S401, the control device 60 determines whether or not there are shared vehicles Vn for which the reservation has been completed. When there is a plurality of shared vehicles for which the reservation has been completed, the process proceeds to step S402, while when there is not a plurality of shared vehicles for which the reservation has been completed, the process proceeds to step S404. In step S404, the control device 60 provides the user who can share a ride with the reservation information of the shared vehicle Vn for which the use request has been made in step S101.

In step S402, the control device 60 determines whether or not the destinations set for the shared vehicles Vn having been reserved are in the same direction. When there are shared vehicles Vn with destinations in the same direction, the process proceeds to step S403, while when there are no shared vehicles Vn with destinations in the same destination, the process proceeds to step S404. In step S404, the control device 60 provides the user who can share a ride with the reservation information of the shared vehicle Vn for which the use request has been made in step S101.

In step S403, the control device 60 extracts, from among the shared vehicles Vn having been reserved, a shared vehicle which the user who can share a ride can get on earliest. For example, the control device 60 extracts a shared vehicle that allows the user to arrive at the travel route at the earliest time.

In step S404, the control device 60 provides the user who can share a ride with the reservation information of the shared vehicle Vn extracted in step S403, and ends the control process.

As described above, in the present embodiment, when the reservation for the plurality of shared vehicles Vn is completed, the shared vehicle management apparatus 140 extracts a shared vehicle on which the user can share a ride earliest from among the shared vehicles Vn having been reserved and provides the reservation information of the extracted shared vehicle. Through this operation, it is not necessary for the other users to confirm the reservation information of the plurality of shared vehicles Vn. It is thus possible to prevent the other users from being bothered.

It should be appreciated that the embodiments explained heretofore are described to facilitate understanding of the present invention and are not described to limit the present invention. It is therefore intended that the elements disclosed in the above embodiments include all design changes and equivalents to fall within the technical scope of the present invention.

For example, in the above-described embodiments, the vehicle type, use start time, departure place, and destination are exemplified as the desired condition when the user uses the shared vehicle Vn, but the present invention is not limited to this. For example, the user's desired condition may include information as to whether ride-sharing is possible or not. When the user's desired condition includes information for refusing ride-sharing, the shared vehicle management apparatus can exclude the reservation information of the shared vehicle used by that user from the reservation information provided to other users.

Figure 9:
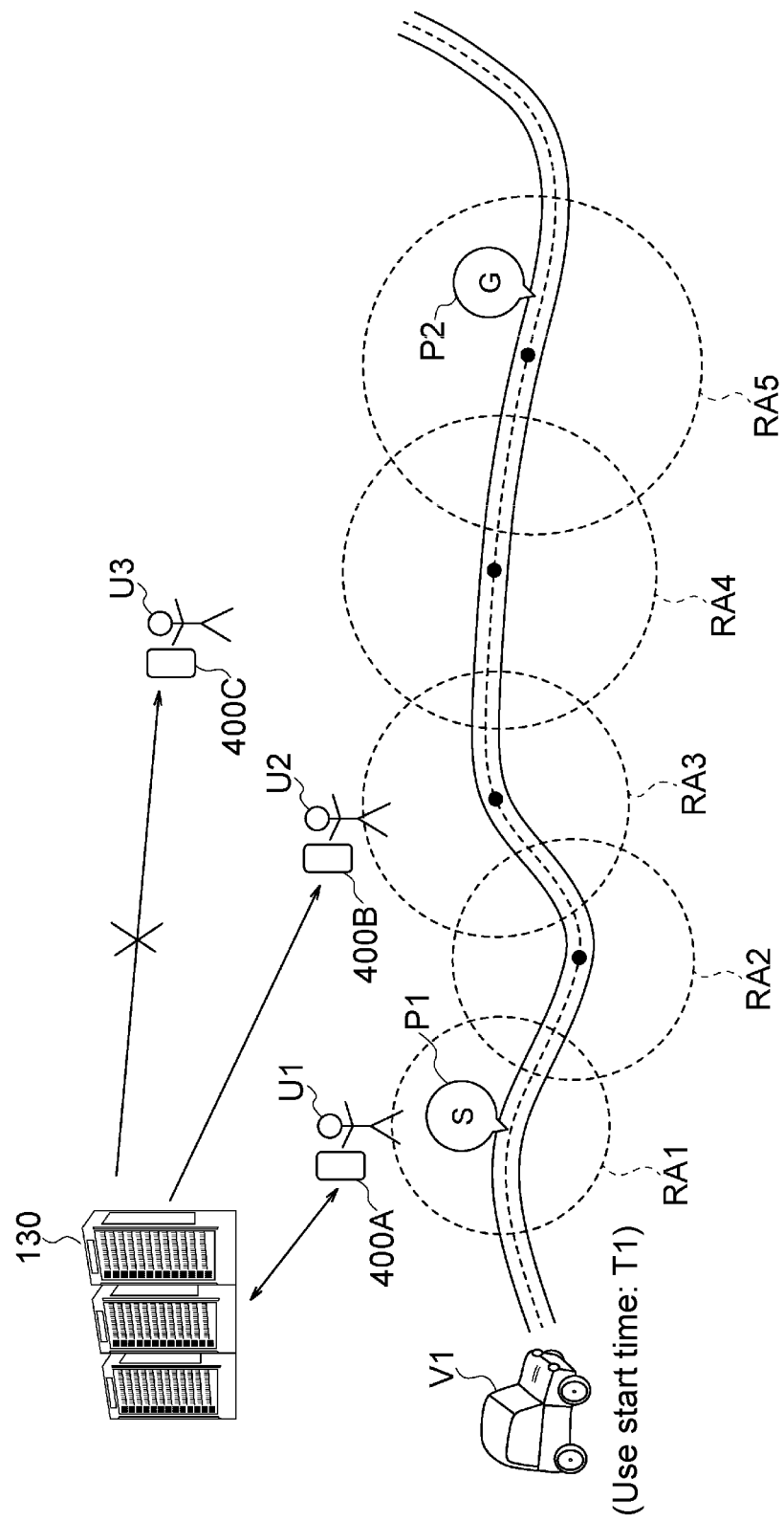
FIG. 9 is a diagram for describing another example of a method of specifying users who can share a ride on a shared vehicle.

In the above-described third embodiment, the method has been exemplified in which a determination is made for each user as to whether or not the ride-sharing on the reserved shared vehicle Vn is possible, but the present invention is not limited to this. For example, as illustrated in FIG. 9, the shared vehicle management apparatus may define areas in which users are located who can arrive at the travel route R1 before the shared vehicle Vn passes through the areas. These areas are defined with reference to the travel route. In this case, as illustrated in FIG. 9, the shared vehicle management apparatus calculates positional areas RA1 to RA5 for users who can share a ride. Each of the positional areas RA1 to RA5 is calculated through multiplying the moving speed of a user by the time until the shared vehicle Vn arrives at each point on the travel route R1. The positional area expands as the shared vehicle Vn travels from the positional area RA1 to the positional area RA5 because the closer to the destination P2, the lower the possibility that the shared vehicle Vn passes through. The shared vehicle management apparatus may determine that users located in the calculated positional areas RA1 to RA5 are those who can share a ride. In the example of FIG. 9, the shared vehicle management apparatus determines the user U2 as a user who can share a ride and determines the user U3 as a user who cannot share a ride. FIG. 9 is a diagram for describing another example of a method of specifying users who can share a ride on a shared vehicle.

In the present description, the information providing apparatus according to the present invention has been described by exemplifying the shared vehicle management apparatus 100 comprising the control device 10, the communication device 20, and the database 30, but the present invention is not limited to this.

DESCRIPTION OF REFERENCE NUMERALS

1 Shared vehicle management system
  100 Shared vehicle management apparatus
  10 Control device
  20 Communication device
  30 Database
V1 to Vn Shared vehicle
200V1 to 200Vn Onboard device
400A to 400Y User terminal device

The invention claimed is:

1. An information providing method for providing information using a server configured to manage a reservation of a shared vehicle to be shared by a plurality of users, a communication device, and a navigation system, comprising:
  receiving information including a desired condition from a user terminal of a specific user who uses the shared vehicle;
  determining, with a control device of the server, whether or not the shared vehicle can be reserved, on a basis of the desired condition;
  receiving, through the communication device, positional information of a plurality of other user terminals of other users who do not make a use request for the shared vehicle and cannot know a usage situation of the shared vehicle unless the user terminal of the other user requests use of the shared vehicle;
  calculating a travel route to a destination of the shared vehicle by the navigation system;
  determining, with the control device of the server, whether or not the plurality of the other user terminals of other users who have not made the use request are able to get on the shared vehicle, on a basis of a travel route of the shared vehicle reserved and the positional information of the plurality of user terminals of other users;
  sending reservation information including a destination of the shared vehicle reserved from the communication device of the server to a user terminal of the plurality of other user terminals of other users who have been determined to be able to get on the shared vehicle;
  sending, with a control device of the server, a move command including the travel route to the shared vehicle to control the shared vehicle with autonomous driving function to be traveled along the travel route in an autonomous manner; and
  wherein determining whether or not the plurality of the other user terminals of other users who have not made the use request are able to get on the shared vehicle comprises:
    calculating a first arrival time, based upon a speed of the user, as a time when the user arrives at a predetermined location on the travel route after moving along a shortest distance from a current position of the user to the predetermined location;
    calculating a second arrival time, on a basis of a use start time and a required time for the shared vehicle to travel along the travel route, as a time when the shared vehicle arrives at the predetermined location on the travel route;
    determining, when the first arrival time is earlier than the second arrival time, that the user can share a ride on the shared vehicle reserved, and
    calculating additional first arrival times and additional second arrival times for each of the other users who has not requested use of the shared vehicle,
    wherein, when a respective first arrival time of the additional first arrival times is earlier than a respective second arrival time of the additional second arrival times, it is determined that a respective other user of the other users can share a ride on the shared vehicle reserved, and when the respective first arrival time is later than the respective second arrival time, it is determined that the respective other user cannot share a ride on the shared vehicle that is reserved.

2. The information providing method according to claim 1, wherein
  the desired condition includes a departure place of the shared vehicle, and the information providing method comprises:
  calculating the travel route of the shared vehicle on a basis of the departure place and the destination; and
  providing the reservation information including the travel route.

3. The information providing method according to claim 2, wherein
  the desired condition includes the use start time, and
  the reservation information includes the destination and the use start time.

4. The information providing method according to claim 1, comprising
  providing the reservation information including application information with which the other user terminals of other users can apply for ride-sharing on the shared vehicle.

5. The information providing method according to claim 4, wherein application for the ride-sharing on the shared vehicle with the application information is valid only within a predetermined period.

6. The information providing method according to claim 1, wherein
  the desired condition includes a departure place of the shared vehicle, and
  the information providing method comprises calculating a travel route of the shared vehicle and a required time for the shared vehicle to travel along the travel route, on a basis of the departure place and the destination.

7. The information providing method according to claim 6, comprising:
  determining whether or not each of the plurality of other users can share a ride on the shared vehicle reserved, on a basis of the positional information, a moving speed of the specific user, a use start time of the specific user, the travel route, and the required time.

8. The information providing method according to claim 1, wherein
  the server manages the reservation of the shared vehicle, and
  the information providing method comprises:
  when the reservation of the shared vehicle is completed, determining the shared vehicle to be an earliest arriving vehicle among a plurality of shared vehicles on which the user can share a ride such that the earliest arriving vehicle has an earliest first arrival time of a plurality of arrival times of the plurality of shared vehicles for which reservation has been completed; and
  providing the reservation information of the shared vehicle.

9. The information providing method according to claim 1, wherein the reservation information of the shared vehicle is provided to the other terminal devices of other users who are determined to be able to get on the shared vehicle on the basis of the positional information after use of the shared vehicle is started.

10. The information providing method according to claim 1, comprising:
  acquiring a moving speed of each of the users; and
  comparing, on a basis of the moving speed, a first required time for each of the other users to move to a boarding location with a second required time for the shared vehicle to move to the boarding location to determine whether or not the other users can get on the shared vehicle, the boarding location being determined on the basis of the positional information.

11. The information providing method according to claim 1, comprising:
  determining a boarding location on the basis of the positional information.

12. An information providing apparatus comprising a server configured to manage a reservation of a shared vehicle to be shared by a plurality of users, a communication device, and a navigation system, the server being further configured to:
  receive information including a desired condition from a user terminal device of a specific user who uses the shared vehicle;
  determine, with a control device of the server, whether or not the shared vehicle can be reserved, on a basis of the desired condition; and
  receive, with the communication device, positional information of a plurality of other user terminal devices of other users who do not make a use request for the shared vehicle and cannot know a usage situation of the shared vehicle unless the user terminal of the other user requests use of the shared vehicle,
  calculate a travel route to a destination of the shared vehicle by the navigation system;
  determine, with the control device of the server, whether or not the plurality of the other user terminals of other users who have not made the use request are able to get on the shared vehicle, on a basis of a travel route of the shared vehicle reserved and the positional information of the plurality of user terminals of other users; and
  send the reservation information including a destination of the shared vehicle reserved from the communication device of the server to a user terminal of the plurality of other user terminals of other users who have been determined to be able to get on the shared vehicle;
  send a move command including the travel route from the communication device of the server to the shared vehicle to control the shared vehicle with autonomous driving function to be traveled along the travel route in an autonomous manner;
  calculate a first arrival time, based upon a speed of the user, as a time when the user arrives at a predetermined location on the travel route after moving along a shortest distance from a current position of the user to the predetermined location;
  calculate a second arrival time, on a basis of a use start time and a required time for the shared vehicle to travel along the travel route, as a time when the shared vehicle arrives at the predetermined location on the travel route;
  determine, when the first arrival time is earlier than the second arrival time, that the user can share a ride on the shared vehicle reserved, and
  calculate additional first arrival times and additional second arrival times for each of the other users who has not requested use of the shared vehicle, and
  wherein, when a respective first arrival time of the additional first arrival times is earlier than a respective second arrival time of the additional second arrival times, it is determined that a respective other user of the other users can share a ride on the shared vehicle reserved, and when the respective first arrival time is later than the respective second arrival time, it is determined that the respective other user cannot share a ride on the shared vehicle that is reserved.

* * * * *